(12) United States Patent
Nakano

(10) Patent No.: US 8,723,985 B2
(45) Date of Patent: *May 13, 2014

(54) CAMERA, CAMERA SYSTEM AND LENS APPARATUS

(71) Applicant: Canon Kabushiki Kaisha, Tokyo (JP)

(72) Inventor: Shingo Nakano, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,732

(22) Filed: Feb. 8, 2013

(65) Prior Publication Data

US 2013/0148001 A1 Jun. 13, 2013

Related U.S. Application Data

(62) Division of application No. 12/956,329, filed on Nov. 30, 2010, now Pat. No. 8,395,690, which is a division of application No. 11/008,975, filed on Dec. 13, 2004, now Pat. No. 7,872,684.

(30) Foreign Application Priority Data

Dec. 15, 2003 (JP) ................................ 2003-417349

(51) Int. Cl.
*H04N 5/76* (2006.01)
*H04N 5/232* (2006.01)

(52) U.S. Cl.
USPC ........................................ 348/231.6; 348/346

(58) Field of Classification Search
USPC ............... 348/231.99, 231.3, 231.6, 345, 346
See application file for complete search history.

(56) References Cited

U.S. PATENT DOCUMENTS

| | | |
|---|---|---|
| 4,674,854 A | 6/1987 | Kawamura et al. |
| 6,175,692 B1 | 1/2001 | Onoda et al. |
| 6,195,159 B1 | 2/2001 | MacDonald et al. |
| 6,249,311 B1 | 6/2001 | Rouse, Jr. et al. |
| 6,392,702 B1 | 5/2002 | Arai et al. |
| 6,941,068 B2 | 9/2005 | Matsuda |
| 6,954,233 B1 | 10/2005 | Ito |
| 7,148,928 B2 | 12/2006 | Minakuti et al. |
| 8,395,690 B2 * | 3/2013 | Nakano ..................... 348/333.02 |

(Continued)

FOREIGN PATENT DOCUMENTS

| | | |
|---|---|---|
| CN | 1 450 398 A | 10/2003 |
| EP | 1 351 086 | 10/2003 |

(Continued)

OTHER PUBLICATIONS

Mar. 16, 2005 European Search Report in European Patent Application No. 04029552.

(Continued)

*Primary Examiner* — Timothy J Henn
(74) *Attorney, Agent, or Firm* — Fitzpatrick, Cella, Harper & Scinto

(57) ABSTRACT

A camera on which a lens apparatus is mounted is disclosed. The camera includes a controller which performs a focusing control corresponding to the mounted lens apparatus; a display unit which performs display process corresponding to an output of the controller; and a storage section which stores correction information for correcting a calculation result in the focusing control by the controller, in association with the mounted lens apparatus.

15 Claims, 30 Drawing Sheets

(56) References Cited

U.S. PATENT DOCUMENTS

| | | |
|---|---|---|
| 2002/0039489 A1 | 4/2002 | Matsuda |
| 2002/0196472 A1 | 12/2002 | Enomoto |
| 2003/0025802 A1 | 2/2003 | Mayer, Jr. et al. |
| 2003/0048374 A1 | 3/2003 | Minakuti et al. |
| 2003/0189662 A1 | 10/2003 | Matsuda |
| 2004/0202464 A1 | 10/2004 | Miyasaka et al. |

FOREIGN PATENT DOCUMENTS

| | | |
|---|---|---|
| EP | 1 507 157 A2 | 2/2005 |
| JP | 60-103331 A | 6/1985 |
| JP | 2-154235 A | 6/1990 |
| JP | 5-127243 A | 5/1993 |
| JP | 5-40036 A | 7/1993 |
| JP | 05-188423 A | 7/1993 |
| JP | 07-168084 A | 7/1995 |
| JP | 7-117677 B2 | 12/1995 |
| JP | 2000-137275 A | 5/2000 |
| JP | 2000-184257 A | 6/2000 |
| JP | 2000-292684 A | 10/2000 |
| JP | 2001-174690 A | 6/2001 |
| JP | 2002-14276 A | 1/2002 |
| JP | 2003-050990 A | 2/2003 |
| JP | 2003-070720 A | 3/2003 |
| JP | 2003-075136 A | 3/2003 |
| JP | 2003-078794 A | 3/2003 |
| JP | 2003-161983 A | 6/2003 |
| JP | 2003-295047 A | 10/2003 |
| JP | 2004-135029 A | 4/2004 |
| JP | 2004-138769 A | 5/2004 |

OTHER PUBLICATIONS

Patent Abstracts of Japan, vol. 017, No. 329 (P-1561), Jun. 22, 1993 (JP 5-40036, Feb. 19, 1993).

Patent Abstracts of Japan, vol. 017, No. 498 (P-1609), Sep. 8, 1993 (JP 5-127243, May 25, 1993).

Patent Abstracts of Japan, vol. 2002, No. 5, May 3, 2002 (JP 2002-14276, Jan. 18, 2002).

* cited by examiner

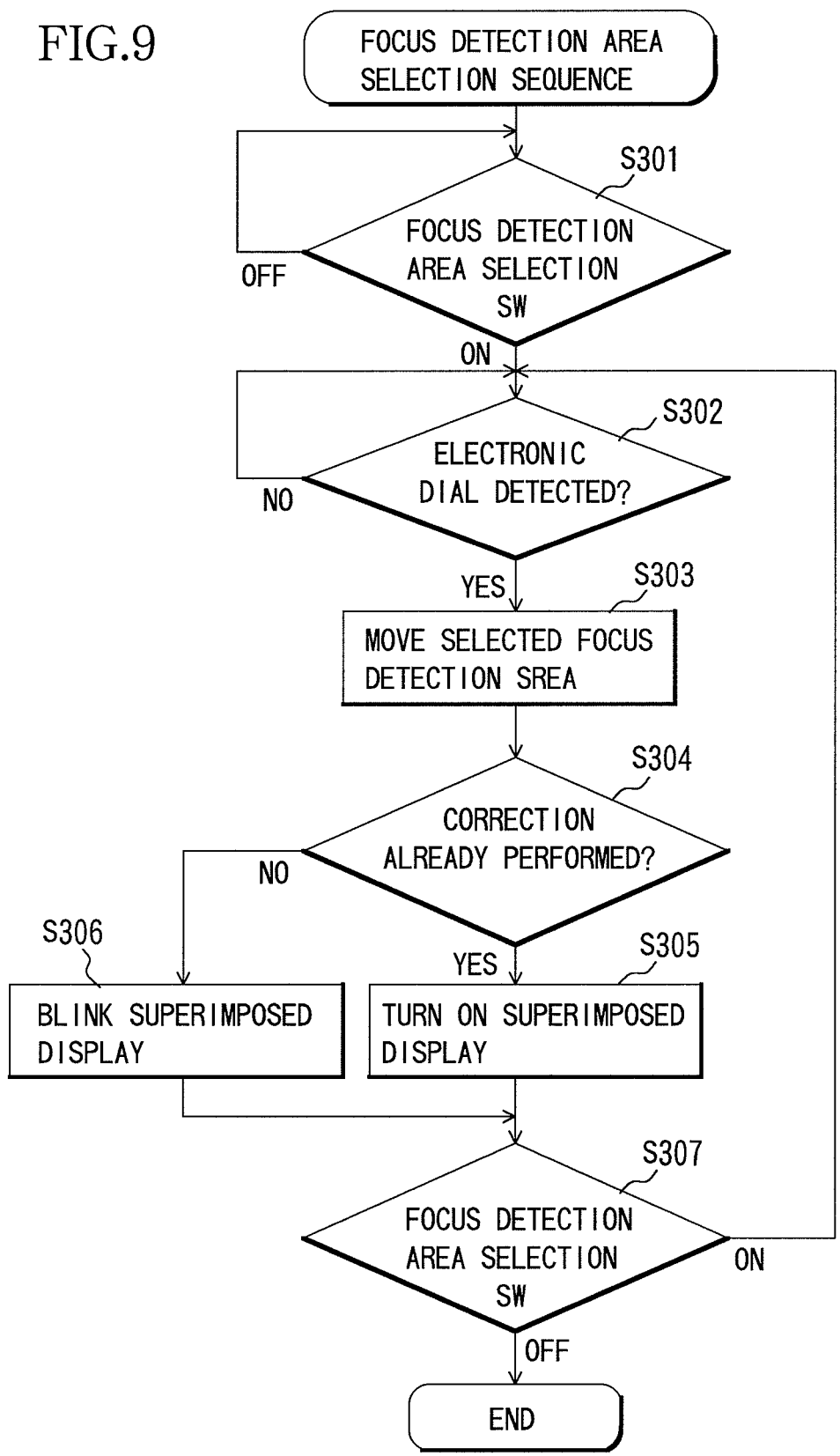

FIG. 19A IN-FOCUS
FIG. 19B FRONT FOCUS
FIG. 19C REAR FOCUS

CAMERA, CAMERA SYSTEM AND LENS APPARATUS

This application is a division of application Ser. No. 12/956,329, filed Nov. 30, 2010, which is a division of application Ser. No. 11/008,975 filed Dec. 13, 2004, which issued as U.S. Pat. No. 7,872,684.

BACKGROUND OF THE INVENTION

1. Field of the Invention

The present invention relates to a camera system having the function of automatically adjusting parameters relating to image taking, and to a camera used for the camera system, an accessory used for the camera system and a lens apparatus used for the camera system.

2. Description of Related Art

Conventionally, a focus detection method based on TTL phase-difference detection has been generally used in lens exchangeable single-lens reflex camera systems. However, it is difficult to completely match a focus position detected by this phase difference detection to the actual surface to be focused.

This is due to factors such as errors occurring at the time of mounting a sensor module employing phase difference detection on a camera body, errors on the side of a camera body such as the dimensional errors of an optical system constituting the sensor module, and manufacturing errors in an image-taking lens manufactured separately from the camera body.

As a method for correcting manufacturing errors, Japanese Patent Application Laid-Open No. 2000-292684 discloses a method for correcting errors on the side of the camera body. This method uses a first focus detection unit employing phase difference detection and a second focus detection unit for autofocusing by evaluating the contrast from an image signal of the image-pickup element, calculates a relative displacement amount from autofocus data obtained by the first and second focus detection units, and corrects the autofocus data of the first focus detection unit.

In the case of single-lens reflex camera systems, several types of lens apparatuses can be mounted. Naturally, each lens apparatus has a different amount of manufacturing errors, resulting in the problem of focus position displacement of the image-taking lens.

One method for solving this problem is performing focus correction for each lens apparatus. More specifically, after performing image-taking with the focus position displaced slightly backward and forward from the focus position set at the time of manufacturing, the obtained image which best matches with a target focus position set by the user is selected, and the focus position is corrected using the relative displacement amount as an AF correction value.

However, the above-described conventional camera system has the following problems. In the case of the camera system disclosed in Japanese Patent Application Laid Open No. 2000-292684, the displacement of the focus position caused by manufacturing errors can be corrected for a combination of a single type of lens apparatus and a camera. However, in the case of a single-lens reflex camera, on which a plurality of lens apparatuses can be mounted, the correction is not performed when the lens apparatus is changed, resulting in the problem of focus position displacement. Japanese Patent Application Laid Open No. 2000-292684 does not disclose any measures against this problem.

On the other hand, this problem can be solved in the above-described method in which focus correction is performed for each lens apparatus. However, when the user has several cameras and lens apparatuses, the user may perform image-taking not knowing whether the displacement amount of the focusing surface is corrected in the combination of camera and lens apparatus used during the image-taking, resulting in the problem that focusing has not been established.

Furthermore, if focus displacement is confirmed after performing image-taking, this also results in the problem that the user cannot determine the camera system requires focus position adjustment or whether there is a defect.

On the other hand, Japanese Patent Publication No. H7(1995)-117677 discloses a technique for storing in advance adjustment values for performing predetermined operations for various functions such as an autofocus adjustment function and an auto exposure function. More specifically, Japanese Patent Publication No. H7-117677 discloses a method of incorporating an adjustment program for an auto exposure function in a camera, causing the camera to detect individual differences among products when a calibration signal indicating that the camera is in a calibration step is supplied, to write an adjustment value corresponding to the individual operation characteristics in a nonvolatile memory, and to execute an adjustment operation.

This method is aimed at detecting, in a calibration step, individual differences among products resulting from discrepancies and the like of the components during manufacturing, storing adjustment values corresponding to the operation characteristics of each product at the time of factory shipment, and performing an appropriate operation during image-taking, based on the adjustment data.

Additionally, Japanese Patent Application Laid-Open No. 2001-174690 discloses a camera which allows the user to freely correct an adjustment value set in a calibration step at the time of factory shipment and to freely restore the setting made at the time of factory shipment, by using a first storage section which stores an adjustment value set in a calibration step, a second storage section which stores a correction value for correcting the adjustment value stored in the first storage section and a modification section which modifies the correction value stored in the second storage section according to the user's intention.

However, in the autofocus adjustment of a lens exchangeable camera, to which a plurality of lens apparatuses having different functions are selectively mounted, the same correction is performed for all the lens apparatuses mounted on the camera. For example, in the case where a plurality of lens apparatuses of the same type are mounted on the camera, the same correction is performed for all the lens apparatuses.

This method can solve the problem when the discrepancies of all the mounted lens apparatuses are sufficiently small and the camera requires calibration. On the other hand, when the lens apparatuses mounted require calibration, calibration has conventionally been performed for the lens apparatuses.

When the discrepancy of both the camera and the lens apparatuses are sufficiently small, it is not necessary to perform calibration for a general practical use in the above-described conventional technique. However, higher focusing accuracy is required for taking special purpose photographs, such as commercial photographs, which need to be enlarged to very large sizes. To perform such a fine-tuning, it is also necessary to take into account discrepancies which occur only when a specific camera and a specific lens apparatus are combined.

That is, for example, even lens apparatuses of the same type have different setting angles with respect to a mount disposed in front of the camera, so that it is necessary to eliminate such minute discrepancies resulting from difference in the setting angle, in order to achieve higher focusing accuracy.

SUMMARY OF THE INVENTION

The present invention has been achieved in view of these circumstances, and it is an object of the present invention to provide a camera which allows the user to readily determine whether the focus position has been properly adjusted in a case where an image is observed at the time of, or after image-taking.

The present invention has been achieved in view of these problems, and it is an object of the present invention to provide a camera which can readily obtain an accurately focused image even when a lens apparatus is changed.

According to one aspect, the present invention provides a camera on which a lens apparatus is mounted, comprises a controller which performs a focusing control corresponding to the mounted lens apparatus; a display unit which performs display process corresponding to an output of the controller; and a storage section which stores correction information for correcting a calculation result in the focusing control by the controller, in association with the mounted lens apparatus. Here, the controller identifies the mounted lens apparatus, determines whether the correction information corresponding to the identified lens apparatus is stored in the storage section, and outputs a signal corresponding to a result of the determination to the display unit.

According to one aspect, the present invention provides a camera on which a plurality of lens apparatuses capable of focusing control can be selectively mounted. The camera comprises a focus detection section which obtains first information used for the focusing control, using a light flux from the mounted lens apparatus; a storage section which stores second information for correcting the first information; and a correction section which corrects the first information based on the second information. Here, the second information is information associated with individual information assigned to each lens apparatus mounted on the camera.

According to one aspect, the present invention provides a camera on which a plurality of lens apparatuses are selectively mounted. The camera comprises an image-pickup element which photoelectrically converts an object image formed by an image-taking optical system in the mounted lens apparatus; an image-taking process section which performs an image-taking process of an image, using the image-pickup element; a detection section which detects a defocus amount of the image-taking optical system; a controller which sequentially changes the defocus amount and instructs the image-taking process section to perform the image-taking process of a plurality of images which differ in the defocus amount; a determination section which determines the defocus amount corresponding to a specific image included in the plurality of images; and a storage section which stores identification information of the lens apparatus in association with the defocus amount determined with the determination section. Here, the controller performs a focusing control in the image-taking optical system, using the defocus amount corresponding to the lens apparatus mounted on the camera, determines identification information of the lens apparatus mounted on the camera, and controls the image-taking process for obtaining the plurality of images in accordance with a result of the determination.

These and further objects and features of present invention will become apparent from the following detailed description of preferred embodiments thereof taken in conjunction with the accompanying drawings.

BRIEF DESCRIPTION OF THE DRAWINGS

FIG. 9 is a flowchart showing a focus detection area selection sequence of the digital camera according to Embodiment 1 of the present invention.

DETAILED DESCRIPTION OF THE PREFERRED EMBODIMENTS

Embodiment 1

Figure 1:
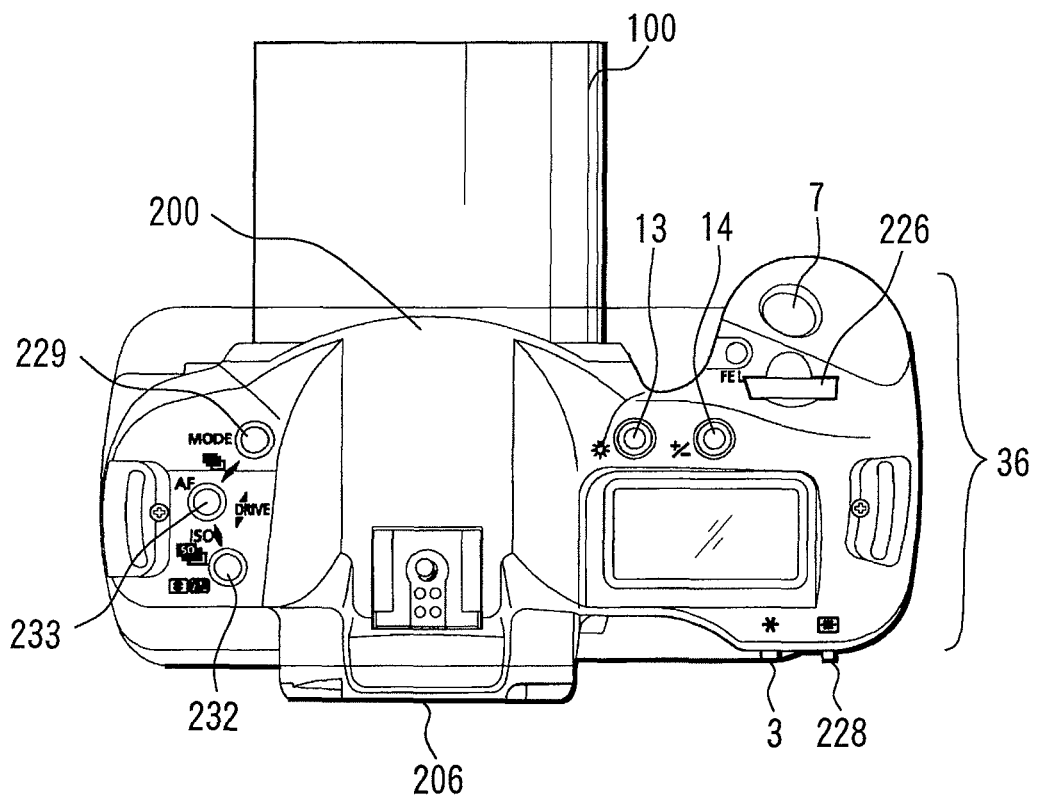
FIG. 1 shows a top plan view of a digital camera according to Embodiment 1 of the present invention.
Figure 2:
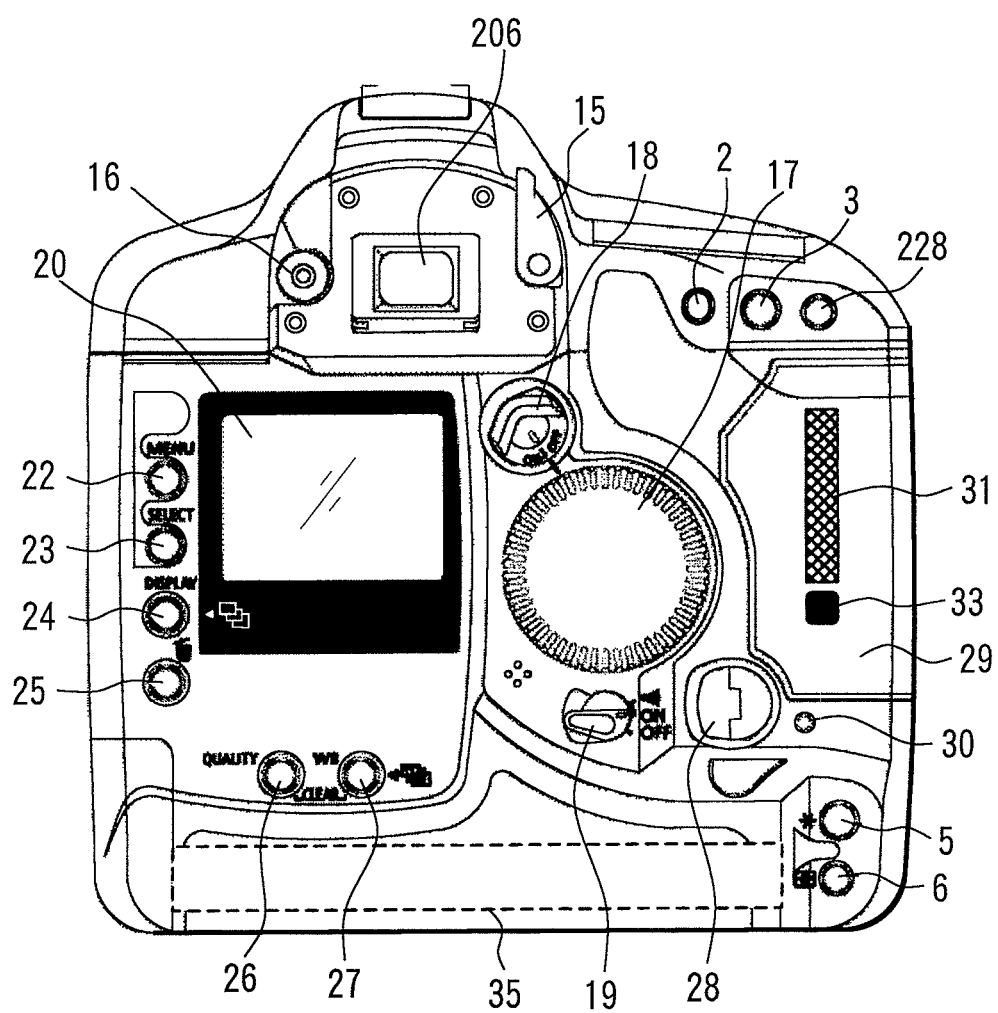
FIG. 2 shows a rear view of the digital camera according to Embodiment 1 of the present invention.

FIGS. 1 and 2 show a single-lens reflex type digital camera system according to Embodiment 1 of the present invention.

FIG. 1 shows a top view showing the structure of the single-lens reflex type digital camera system according to Embodiment 1, and FIG. 2 shows a rear view showing the structure of the digital camera system.

In FIGS. 1 and 2, reference numeral 200 denotes a camera body, and 100 denotes a lens apparatus. Reference numeral 206 denotes an eyepiece for viewing an object image though an optical viewfinder. Numeral 2 denotes an AF correction confirmation button, 3 denotes an AE (auto exposure) lock button, and 228 denotes a focus detection area selection button. Reference numeral 5 denotes a vertical position AE (auto exposure) lock button used when the camera body 200 is held in a vertical position, and having the same function as the AE lock button 3. Similarly, reference numeral 6 denotes a vertical position focus detection area selection button used when the camera body 200 is held in a vertical position, and having the same function as the focus detection area selection button 228.

Reference numeral 7 denotes a release button for performing an image-taking operation, and having a structure in which a release SW1 (231) is turned ON by a first stroke operation, and a release SW2 (230) is turned ON by a second stroke operation.

Reference numeral 226 denotes a main electronic dial whose rotating direction and number of rotation clicks are detected by sending to the system controller 223, 2-bit signals which are out of phase with one another by, for example, 90°. By detecting the rotating direction and the number of rotation clicks, it is possible to input numerical values to the camera or to switch the image-taking mode by using the main electronic dial in combination with other operation buttons.

It should be noted that this information setting can be carried out by, for example, the method disclosed in Japanese Patent Application Laid-Open No. S60(1985)-103331.

In FIGS. 1 and 2, reference numeral 229 denotes an image-taking mode selection button, 233 denotes an AF mode selection button, and 235 denotes a photometry mode selection button, which also serves as a modulation light correction button.

For example, when the main electronic dial 226 is rotated while pressing the image-taking mode selection button 229, the mode is changed in the following order: Tv priority, Av priority, manual, program, Tv priority, Av priority, manual, program . . . . Thus, the photographer can set a desired mode.

When the main electronic dial 226 is reversely rotated, the mode is changed in the following order: program, manual, Av priority, Tv priority, program . . . .

Further, when the Tv priority mode is set with the image-taking mode selection button 229 and the main electronic dial 226, the photographer can set a desired Tv value by rotating the main electronic dial 226.

When the Av priority mode is set with the image-taking mode selection button 229 and the main electronic dial 226, the photographer can set a desired Av value by rotating the main electronic dial 226.

By rotating the main electronic dial 226 while pressing the AF mode selection button 233, the AF (autofocus) mode and the MF (manual focus) mode can be selected.

Reference numeral 250 denotes an external liquid crystal display unit equipped with an external display function which indicates image-taking conditions and the like. The details of the displayed contents will be described later with reference to FIG. 3.

Reference numeral 13 denotes a display panel illumination button for turning a backlight illumination unit (not shown) disposed on the rear side of the external liquid crystal display unit 250 on or off.

Reference numeral 14 denotes an exposure compensation button for performing exposure compensation. When the manual mode is set with the image-taking mode selection button 229 and the main electronic dial 226, the aperture value is set by pressing the exposure compensation button 14, and thereafter rotating the main electronic dial 226. In the program mode (P), the shutter priority mode (Tv) and the aperture priority mode (Av), the exposure compensation amount for changing the controlled exposure amount of the camera with respect to the measured correct exposure is set by pressing the exposure compensation button 14, and thereafter rotating the main electronic dial 226.

In FIG. 2, reference numeral 15 denotes an eyepiece shutter lever for actuating an eyepiece shutter (not shown). Rotating the eyepiece shutter lever 15 clockwise allows the eyepiece shutter (not shown) to cover the eyepiece 206, thus preventing light from entering from the eyepiece.

Reference numeral 16 denotes a dioptric correction dial for dioptric adjustment. Rotating the dioptric correction dial 16 permits a dioptric adjustment lens (not shown) to be driven, thus performing dioptric adjustment.

Reference numeral 17 denotes a sub electronic dial having a function similar to that of the main electronic dial 226. When the manual mode is set with the image-taking mode selection button 229 and the main electronic dial 226, the sub electronic dial 17 is used to set the aperture value, and in the program mode (P), the shutter priority mode (Tv) and the aperture priority mode (Av), to set the exposure compensation amount for changing the controlled exposure amount of the camera with respect to the measured correct exposure.

Reference numeral 18 denotes a dial lock switch for locking the input function performed with the sub electronic dial 17, and 19 denotes a main switch for disabling all the operations of the digital camera of this embodiment.

Reference numeral 213 denotes an LCD monitor unit (liquid crystal display) which displays an obtained image or the setting conditions of the digital camera of this embodiment.

It should be noted that the LCD monitor unit 213 of this embodiment is of the transmissive type, so that an image cannot be visually recognized only by driving the LCD monitor unit and it is essential to provide a backlight illumination unit (not shown) on the rear side of the LCD monitor unit.

Reference numeral 22 denotes a menu button for selecting various modes at the time of initializing the camera. To select a mode, a desired menu is selected by rotating the sub electronic dial 17 while pressing the menu button 22. After selecting the desired menu, the selection is completed by releasing the menu button 22.

Thereafter, to turn the function of the selected menu on or off, <ON> or <OFF> is selected by rotating the sub electronic dial 17 while pushing a select button 23, and the selection is completed by releasing the select button 23.

Reference numeral 24 denotes a display button for displaying, on the LCD monitor unit 213, image files (obtained images) recorded in a recording medium 218. By rotating the sub electronic dial 17 while pressing the display button 24, the image files are successively displayed on the LCD monitor unit 213. After selecting a desired image, the selection is completed by releasing the display button 24, and the selected image is displayed on the LCD monitor unit 213.

Reference numeral 25 denotes an erase button for erasing image files (obtained images) recorded in the recording medium 218. After selecting an image with the display button 24 and the sub electronic dial 17, the selected image can be erased by pressing the erase button 25.

Reference numeral 26 denotes a recording image quality selection button for selecting the compression ratio, the size and the like of obtained image files. After selecting an image quality modification menu with the menu button 22 and the sub electronic dial 17, a desired compression ratio or desired image size is selected with the recording image quality selection button 26 and the sub electronic dial 17, and the selection is completed by releasing the recording image quality selection button 26.

Reference numeral 27 denotes a white balance selection button for selecting a white balance adjustment value already stored in the camera. After selecting a white balance modification menu with the menu button 22 and the sub electronic dial 17, a desired white balance adjustment value is selected with the white balance selection button 27 and the sub electronic dial 17, and the selection is completed by releasing the white balance selection button 27.

Reference numeral 28 denotes a card slot cover release knob. Rotating the card slot cover release knob 28 anticlockwise releases a card slot cover 29, making it possible to house or remove a recording medium with respect to the card slot.

Reference numeral 30 denotes an access lamp, which blinks when the recording medium is accessed, for example, when an obtained image file is written in the inserted recording medium or when an image file written in the recording medium is read out.

Reference numeral 218 denotes a recording medium disposed in a grip section 36 of the digital camera of this embodiment. Reference numeral 33 denotes a card eject button for removing the recording medium 218. Numeral 35 denotes a power supply battery for driving the digital camera system of this embodiment.

Figure 3:
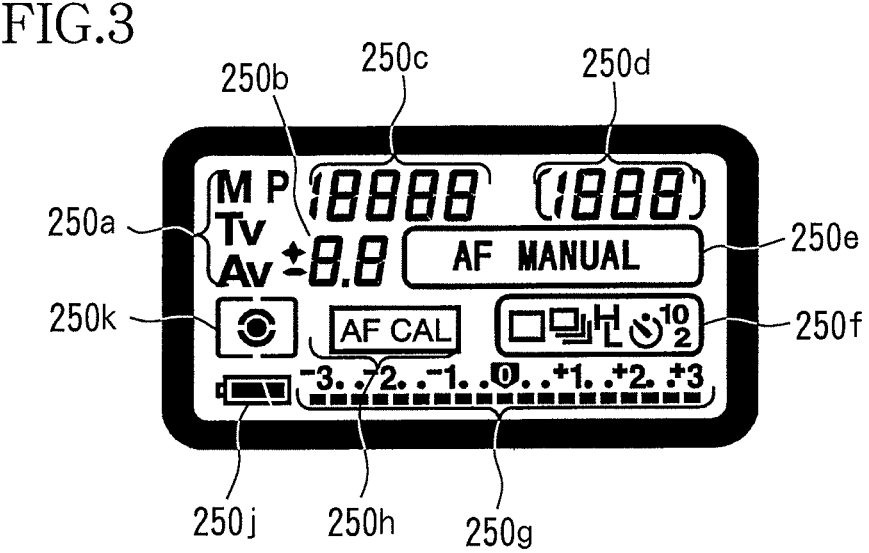
FIG. 3 shows a detailed view of an external liquid crystal display unit mounted on the digital camera according to Embodiment 1 of the present invention.

In the following, the contents displayed on the external liquid crystal display unit 250 are described in detail with reference to FIG. 3. In FIG. 3, section 250a indicates an image-taking mode status. Section 250b indicates an aperture value by seven segment display at the time of regular image-taking, and it may also indicate the AF focus correction amount. The timing of displaying the AF focus correction amount will be described later.

Section 250c indicates the shutter speed by seven segment display. Section 250d indicates the remaining number of images which can be taken, and 250h indicates a correction amount identification mark for notifying the photographer that the AF focus correction amount has been calculated for the combination of the camera body and the lens apparatus. The timing of displaying the AF focus correction amount and the correction amount identification mark will be described later.

Section 250e indicates an AF mode status, and 250f indicates a drive mode status. Section 250g indicates an exposure compensation amount with dots, wherein a single dot represents ⅓ step. Section 250j indicates the estimated remaining capacity of the power source battery 35, and 250k indicates a photometry mode status.

Figure 4A:
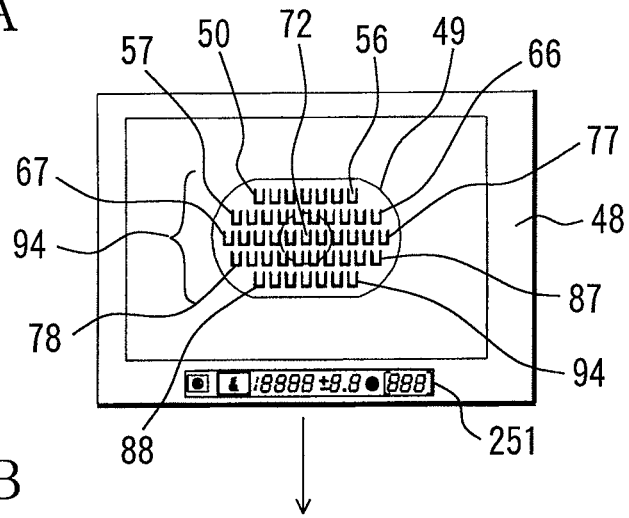
FIGS. 4A and 4B show detailed views of an internal liquid crystal display unit mounted on the digital camera according to Embodiment 1 of the present invention.
Figure 4B:
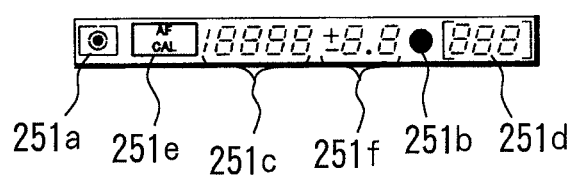

FIGS. 4A and 4B are diagrams showing a viewfinder field in a state in which all the contents to be displayed in the viewfinder of the digital camera of this embodiment are displayed. FIG. 4A shows an overall view of the viewfinder field, and FIG. 4B shows a detailed view of an internal liquid crystal display unit 251 disposed outside the viewfinder field.

In FIG. 4, reference numeral 48 denotes a visual field mask, 49 denotes a focus detection visual field frame formed on a focusing screen (not shown) for showing a focus detection area. In the focus detection visual field frame, focus detection area segments (also referred to as "focus detection areas") 50 to 94 are superimposed. The structure for the superimposed display is disclosed, for example, in Japanese Patent Application Laid-Open No. 2000-250120.

Reference numeral 251 denotes an internal liquid crystal display unit disposed outside the viewfinder visual field. In FIG. 4B, section 251a indicates the photometry mode status, and section 251b indicates a focusing mark which is turned on at in-focus. Section 251c indicates the shutter speed by seven segment display.

Section 251d indicates the remaining number of images which can be taken, and 251e indicates a correction amount identification mark for notifying the photographer that the AF focus correction amount has been calculated for the combination of the camera and the lens apparatus. The timing of displaying the AF focus correction amount and the correction amount identification mark will be described later.

Section 251f indicates the aperture value by seven segment display at the time of regular image-taking, and it may also display the AF focus correction amount. The timing of displaying the AF focus correction amount will be described later.

Figure 5:
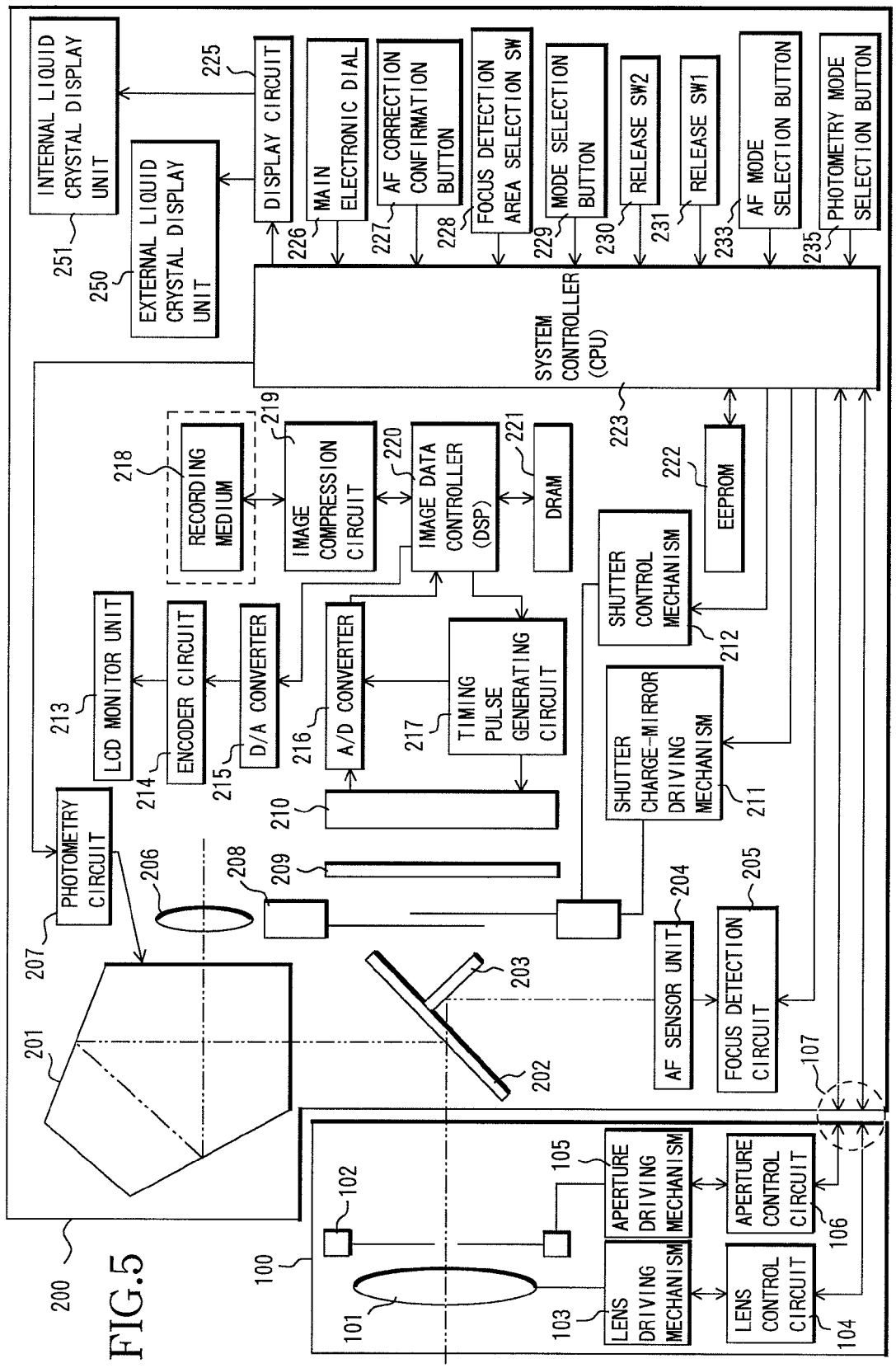
FIG. 5 is a block diagram of the digital camera according to Embodiment 1 of the present invention.

FIG. 5 is a block diagram showing the electrical configuration incorporated in the digital camera having the above-described structure. In FIG. 5, components that are the same as the components shown in FIGS. 1 to 4 are given the same reference numerals.

As shown in FIG. 5, the lens apparatus 100 is removably mounted on the camera body 200 according to this embodiment via a mounting section (not shown). A group of electrical contacts 107 is provided at the mounting section.

The contact group 107 has the functions of transmitting and receiving control signals, status signals, data signals and the like between the camera body 200 and the lens apparatus 100, while supplying current at various voltages. It also has the function of sending a signal to a system controller 223 upon connection of the lens apparatus.

This makes it possible to carry out communication between the digital camera 200 and the lens apparatus 100, thus driving an image-taking lens 101 and an aperture stop 102 in the lens apparatus 100. The contact group 107 may also be configured so as to perform optical communication, audio communication and the like, in addition to electrical communication.

Additionally, although the lens apparatus of this embodiment is shown to be constituted by a single image-taking lens for the sake of convenience, the actual lens apparatus is constituted by many lenses as is generally known.

An image-taking light flux from an object (not shown) is guided to a quick-return mirror 202 via the image-taking lens 101 and the aperture stop 102. The central part of the quick-return mirror 202 is formed as a half mirror, through which a portion of the light flux is transmitted when the quick-return mirror 202 has been moved down. Then, the transmitted light flux is reflected downward by a sub mirror 203 disposed on the quick-return mirror 202.

Reference numeral 204 denotes an AF sensor unit using conventional phase difference detection which is made up of a field lens disposed in the vicinity of an image-forming surface, a reflection mirror, a secondary image-forming lens, an aperture stop, a line sensor including a plurality of CCD sensors and the like, which are not shown in FIG. 5. The AF sensor unit 204 is configured so as to be able to perform focus detection on 45 areas of the object field at the locations of the focus detection areas 50 to 94 in the viewfinder visual field, which has been already described with reference to FIGS. 4A and 4B.

Then, based on a control signal output from the system controller 223, a focus detection circuit 205 controls the AF sensor unit 204 to perform focus detection by conventional phase difference detection.

On the other hand, the image-taking light flux reflected by the quick-return mirror 202 reaches the eyes of the photographer via a pentaprism 201 and the eyepiece 206.

When the quick-return mirror 202 is moved up, the light flux from the image-taking lens 101 reaches an image-pickup element 210 such as a CCD sensor and a CMOS sensor, via a focal plane shutter 208 which is a mechanical shutter, and a filter 209.

It should be noted that although a solid state image-pickup element such as a CCD sensor and a CMOS sensor is used in this embodiment, it is possible to use a silver halide film or an image-pickup tube such as a vidicon.

The filter 209 has the following two functions. One is to block infrared rays and to guide only visible rays to the image-pickup element 210. The other is to serve as an optical low-pass filter. In addition, the focal plane shutter 208 includes a front curtain and a rear curtain, and transmits and blocks the light flux from the image-taking lens 101.

Additionally, when the quick-return mirror 202 is moved up, the sub mirror 203 is folded against the quick-return mirror 202.

Furthermore, the camera body 200 of this embodiment is provided with the system controller 223 (hereinafter, also occasionally referred to as "CPU 223") constituted by a CPU which serves to control the entire operation of the digital camera, and appropriately controls the operations of various sections which will be described later.

The system controller 223 is connected to: a lens control circuit 104 which controls a lens driving mechanism 103 for performing focusing by moving the image-taking lens 101 in the optical axis direction; an aperture control circuit 106 which controls an aperture driving mechanism 105 for driving the aperture stop 102; a shutter charge-mirror driving mechanism 211 which controls the driving of the up and down movements of the quick-return mirror 202 and the driving of the shutter charge of the focal plane shutter 208; a shutter control circuit 212 for controlling the movement of the front curtain and the rear curtain of the focal plane shutter 208; a photometry circuit 207 connected to a photometry sensor (not shown) disposed in the vicinity of the eyepiece 206; and an EEPROM 222 serving as a storage section which stores parameters necessary to be adjusted to control the digital camera 200, camera ID information which enables individual identification of the digital camera, AF correction data adjusted with a reference lens, an auto exposure compensation value and the like.

The lens control circuit 104 also includes a lens storage circuit which stores information unique to the lens, such as a focal length, open aperture and a lens ID assigned to an individual lens, and information received from the system controller 223.

The photometry sensor connected to the photometry circuit 207 is a sensor for measuring the brightness of the object, and its output is supplied to the system controller 223 from the photometry circuit 207.

The system controller 223 controls the lens driving mechanism 103 to form an object image on the image-pickup element 210. In addition, the system controller 223 controls the aperture driving mechanism 105 for driving the aperture stop 102 based on a set Av value, and also outputs a control signal to the shutter control circuit 212 based on a set Tv value.

The driver of the front curtain and the rear curtain of the focal plane shutter 208 is constituted by a spring, and it is necessary to charge the spring after a shutter movement for the subsequent operation. The shutter charge-mirror driving mechanism 211 controls this spring charging. The shutter charge-mirror driving mechanism 211 also moves the quick-return mirror 202 up and down.

Further, the system controller 223 is connected to an image data controller 220. The image data controller 220 is constituted by a DSP (digital signal processor) and performs, for example, the control of the image-pickup element 210 and the correction or process of image data input from the image-pickup element 210, in accordance with commands from the system controller 223. The items of the correction and process of the image data include auto white balance. Auto white balance is the function of correcting a portion of an obtained image which has the highest brightness to have a predetermined color (white). The correction amount for the auto white balance can be changed in accordance with commands from the system controller 223.

The image data controller 220 is connected to: a timing pulse generating circuit 217 which outputs a pulse necessary for driving the image-pickup element 210; an A/D converter 216 for receiving, together with the image-pickup element 210, a timing pulse generated with the timing pulse generating circuit 217 and converting an analog signal corresponding to an object image output from the image-pickup element 210 to a digital signal; a DRAM 221 which temporarily stores the obtained image data (digital data); a D/A converter 215; and an image compression circuit 219.

The DRAM 221 is used for temporarily storing image data before the image data is processed or converted to a predetermined format.

The D/A converter 215 is connected to the LCD monitor unit 213 via an encoder circuit 214. Furthermore, the image compression circuit 219 is connected to the recording medium 218.

The LCD monitor unit 213 is a circuit for displaying image data obtained with the image-pickup element 210, and is ordinarily constituted by a color liquid crystal display device.

The image data controller 220 converts image data in the DRAM 221 into an analog signal with the D/A converter 215, and outputs the signal to the encoder circuit 214. The encoder circuit 214 converts the output from the D/A converter 215 into a video signal (e.g., an NTSC signal) which is necessary for driving the LCD monitor unit 213.

The image compression circuit 219 is a circuit for performing compression or conversion (e.g., JPEG) of image data stored in the DRAM 221. The converted image data is stored in the recording medium 218. Examples of such a recording medium include hard disks, flash memories and flexible disks.

Furthermore, the system controller 223 is connected to: an operation display circuit 225 for displaying operation mode information, exposure information (e.g., the shutter speed and the aperture value) and the like of the digital camera on the external liquid crystal display unit 250 or the internal liquid crystal display unit 251; the main electronic dial 226; an AF correction confirmation button 227; a focus detection area selection button 235 for selecting a focus detection position used during focus detection from a plurality of focus detection positions which the AF sensor unit 204 has; the image-taking mode selection button 229 with which the user sets a mode for causing the digital camera to execute a desired operation; the release SW1 (231) for starting a preparatory operation for image-taking, such as photometry and focus detection; the release SW2 (230) for starting an image-taking operation; the AF mode selection button 233; and the photometry mode selection button 235.

Figure 6:
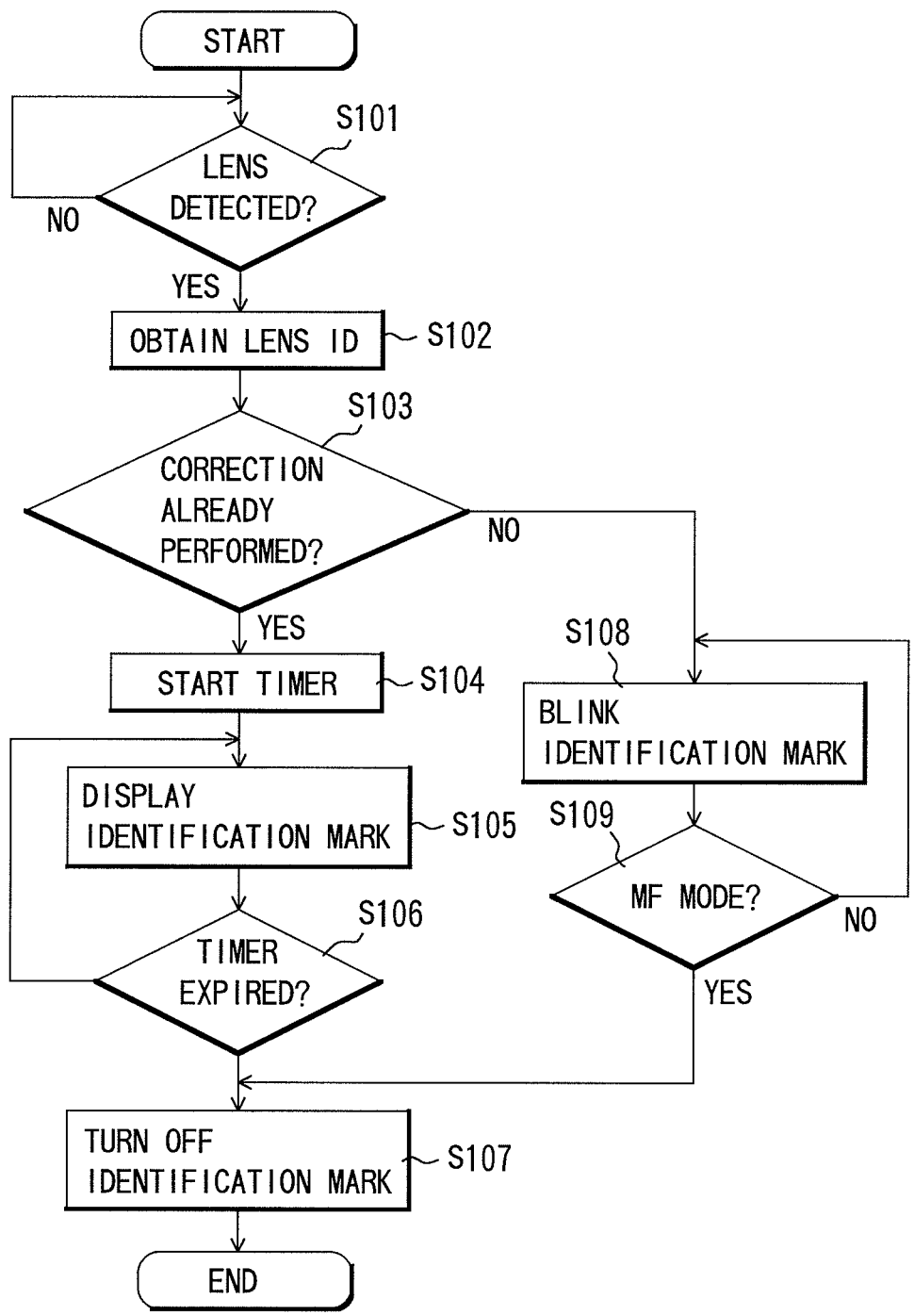
FIG. 6 is a flowchart for displaying an identification mark on the digital camera according to Embodiment 1 of the present invention.

In the following, the operation flow of the digital camera configured as above is described with reference to FIGS. 6 to 9. FIG. 6 is a flowchart showing the displaying process of an identification mark according to the present invention. Referring to FIG. 6, in step (abbreviated as "S" in the FIG. 101, it is detected whether the lens apparatus 100 has been mounted on the camera body 200. If it is determined that the lens apparatus 100 has been mounted, the procedure advances to step 102.

In step 102, the system controller 223 communicates with the lens control circuit 104 to receive lens ID information, and the procedure advances to step 103.

In step 103, the system controller 223 communicates with the EEPROM 222 to determine whether the obtained lens ID information is stored in the EEPROM 222. If the system controller 223 determines as a result of communicating with the EEPROM 222 that the obtained lens ID information is stored, it determines that the correction amount for focus correction has already been calculated for the currently mounted lens apparatus 100, and the procedure advances to step 104.

On the other hand, if the system controller 223 determines as a result of communicating with the EEPROM 222 that the obtained lens ID information is not stored, it determines that a lens apparatus for which the focus correction amount has not been calculated is mounted, and the procedure advances to step 108.

If it is determined in step 103 that a lens apparatus for which the focus correction amount has already been calculated is mounted and then the procedure has advanced to step 104, a timer set for a predetermined time is started in step 104, and the procedure advances to step 105.

In step 105, a correction amount identification mark and an AF correction amount is displayed on the external liquid crystal display unit 250 and the internal liquid crystal display unit 251.

Figure 7A:
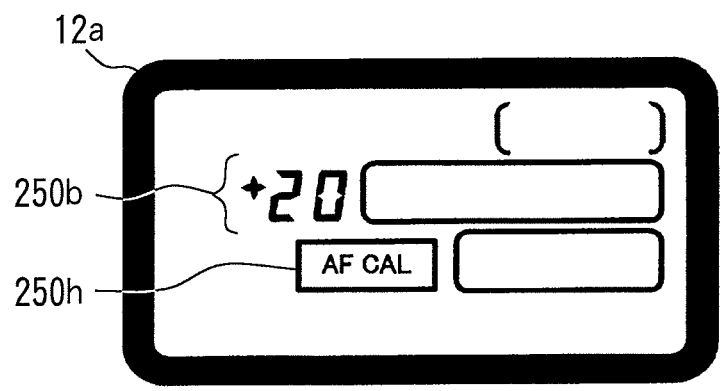
FIGS. 7A to 7D are diagrams showing how an identification mark is displayed on the digital camera according to Embodiment 1 of the present invention.
Figure 7B:
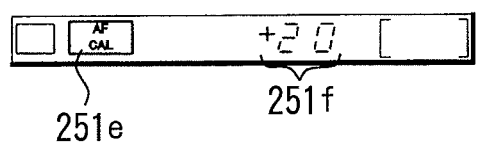

Here, the display of the correction amount identification mark and the AF correction amount is described with reference to FIGS. 7A to 7D. FIGS. 7A and 7B show a display state of the external liquid crystal display unit 250 and the internal liquid crystal display unit 251 when a lens apparatus 100 for which the focus correction amount has been calculated is mounted.

Referring to FIG. 7A, section 250h indicates a correction amount identification mark indicating that the focus correction amount has been calculated, and 250b indicates the calculated focus correction amount (unit: μm). In FIG. 7A, it is indicated that the focus position has been corrected by +20 μm.

Referring to FIG. 7B, section 251e indicates a correction amount identification mark indicating that the focus correction amount has been calculated, and 251f denotes a calculated focus correction amount (unit: μm). In FIG. 7B, it is indicated that the focus position has been corrected by +20 μm.

Displaying the correction amount identification mark in this way allows the photographer to recognize that focus correction is performed for the combination of the camera body and the lens apparatus, so that the photographer can perform image-taking comfortably.

Referring again to FIG. 6, after displaying the correction amount identification mark in step 105, the procedure advances to step 106, in which it is determined whether the timer started in step 104 has expired. If it is determined that the timer has not expired, the procedure returns to step 105, and the correction amount identification mark continues to be displayed.

On the other hand, if it is determined that the timer has expired, the procedure advances to step 107, in which the correction amount identification mark displayed in step 105 is turned off, and the procedure returns to a preparatory state for image-taking. Since the correction amount identification mark is displayed only for a predetermined time after mounting the lens apparatus in this way, it is possible to eliminate inconvenience which would have been caused when the correction amount identification mark is displayed every time during image-taking.

Figure 7C:
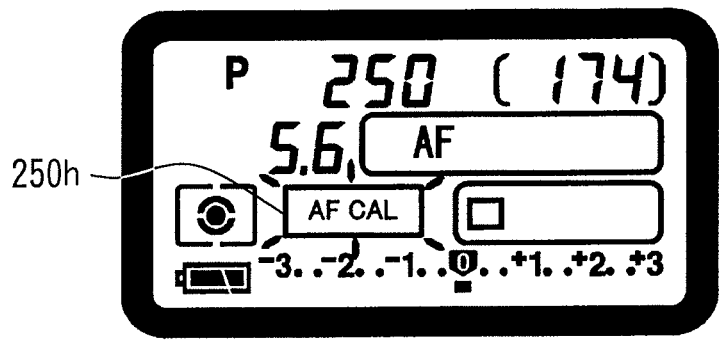
Figure 7D:
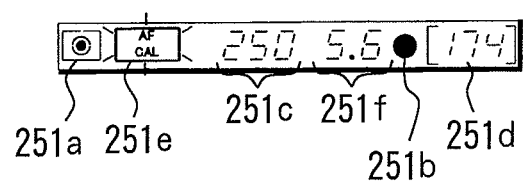

If it is determined in step 103 that a lens apparatus 100 for which the focus correction amount has not yet been calculated is mounted, the procedure advances to step 108, in which the correction amount identification mark blinks. Here, the display format is described with reference to FIGS. 7C and 7D. FIGS. 7C and 7D show a display state of the external liquid crystal display unit 250 and the internal liquid crystal display unit 251 when a lens apparatus 100 for which the focus correction amount has not been calculated is mounted.

As shown in FIGS. 7C and 7D, since the correction amount identification marks 250h and 251e blink, the photographer can easily recognize that a lens apparatus for which the focus correction amount has not been calculated, i.e., a lens apparatus for which focus correction is not performed is mounted, so that it is possible to avoid the problem that the photographer continues to take images in a state in which in-focus has not been established.

Although a warning display is provided to the photographer by letting the correction amount identification marks 250h and 251e blink in this embodiment, it is also possible to disable the image-taking operation, instead of providing a warning display. A warning may also be provided by producing sounds, or vibrating the camera.

Referring again to FIG. 6, after letting the correction amount identification marks blink in the step 108, it is determined in step 109 whether the AF mode is set to the manual focus mode by operating the AF mode selection button 233. Then, if it is determined that the manual focus mode is not selected, the procedure returns to step 108, in which the correction amount identification marks is continued to blink.

On the other hand, if it is determined that the manual focus mode is selected, the procedure advances to step 107, in which the correction amount identification marks are turned off. If the manual focus mode is selected, focus adjustment is carried out by the photographer, so that it is not necessary to notify the photographer that focus correction is not performed. That is, it is not necessary to cause the identification mark to blink. Accordingly, it is possible to eliminate inconveniences for the photographer by turning off the identification mark.

Although the identification mark is displayed for a predetermined period after mounting the lens apparatus in this embodiment, the identification mark may be displayed every time during image-taking. Further, although the identification mark is displayed on both the external liquid crystal display unit 250 and the internal liquid crystal display unit 251 in this embodiment, the identification mark may be displayed on only one of them.

Embodiment 2

A method according to this embodiment for displaying a correction amount identification mark in a case where the AF correction confirmation button 2 is pressed is described with reference to the flowchart of FIG. 8. It should be noted that the camera system of this embodiment has the same structure as Embodiment 1, so that the description has been omitted here.

Figure 8:
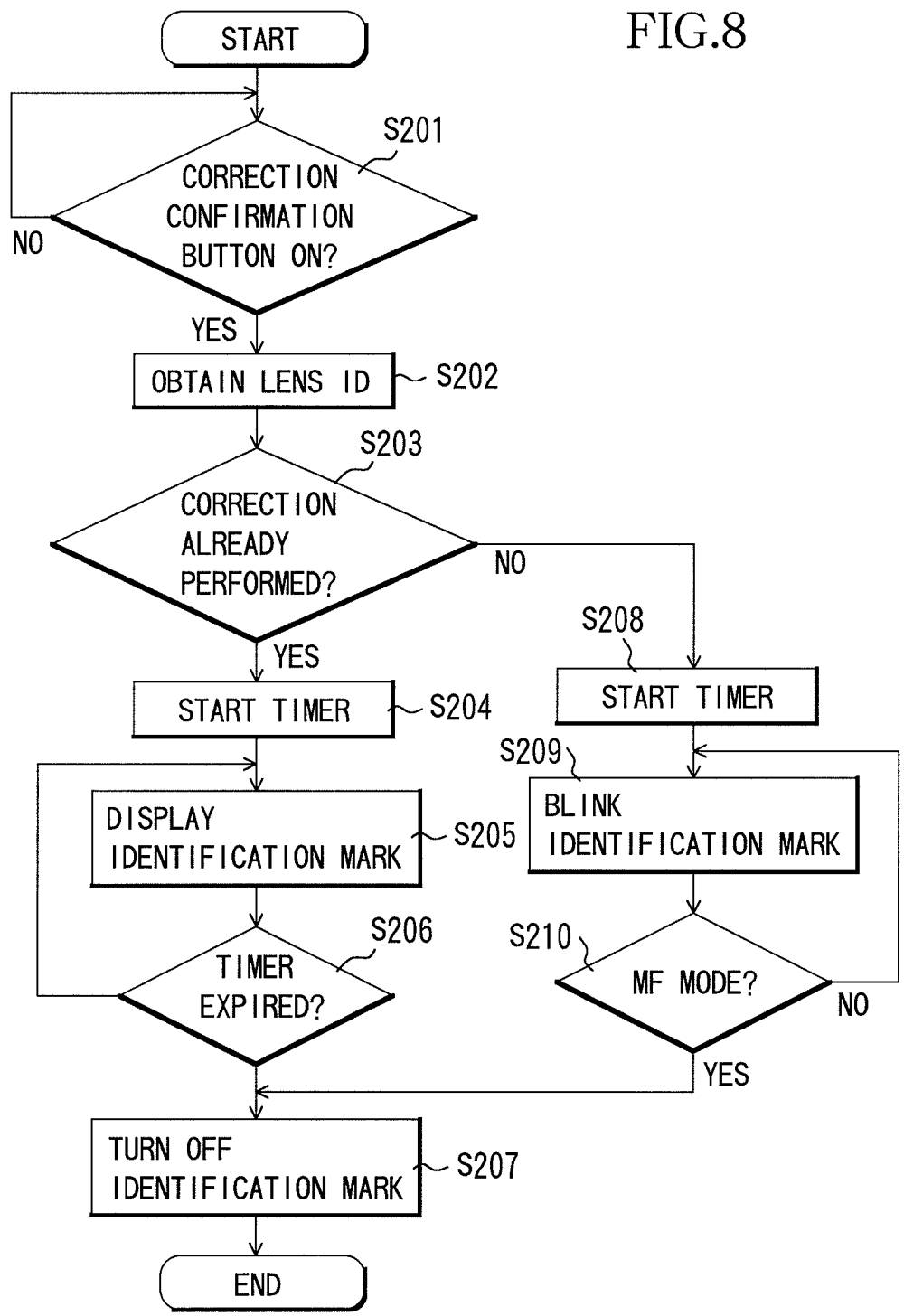
FIG. 8 is a flowchart for displaying an identification mark on the digital camera according to Embodiment 1 of the present invention.

Referring to FIG. 8, it is determined in step 201 whether the AF correction confirmation button 2 is pressed. If it is determined that the AF correction confirmation button 2 is not pressed, the determination is repeated until the AF correction confirmation button 2 is pressed.

On the other hand, if it is determined that the AF correction confirmation button 2 is pressed, the procedure advances to step 202, in which the system controller 223 communicates with the lens control circuit 104 to receive lens ID information, and the procedure advances to step 203.

In step 203, the system controller 223 communicates with the EEPROM 222 to determine whether the obtained lens ID information is stored. If the system controller 223 determines as a result of communicating with the EEPROM 222 that the obtained lens ID information is stored, it determines that the correction amount for focus correction has been calculated for the mounted lens apparatus 100, and the procedure advances to step 204.

On the other hand, if the system controller 223 determines as a result of communicating with the EEPROM 222 that the obtained lens ID information is not stored, it determines that a lens apparatus for which the focus correction amount has not been calculated is mounted, and the procedure advances to step 208.

If it is determined in step 203 that a lens apparatus for which the focus correction amount has already been calculated is mounted and then the procedure advances to step 204, a timer set for a predetermined time is started in step 204, and the procedure advances to step 205.

In step 205, an identification mark and a correction amount are displayed on the external liquid crystal display unit 250 and the internal liquid crystal display unit 251. The method for displaying the identification mark is performed as shown in FIGS. 7A and 7B as in Embodiment 1.

After displaying the correction amount identification mark in step 205, the procedure advances to step 206, and it is determined whether the timer started in step 204 has expired. If it is determined that the timer has not expired, the procedure returns to step 205, in which the correction amount identification mark continues to be displayed.

On the other hand, if it is determined that the timer has expired, the procedure advances to step 207, in which the correction amount identification mark displayed in step 205 is turned off, and the procedure returns to a preparatory state for image-taking. In step 203, if it is determined that a lens apparatus for which the focus correction amount has not been calculated is mounted, the procedure advances to step 208, in which the timer is started, and the procedure advances to step 209.

In step 209, a display as shown in FIGS. 7C and 7D is provided, and the procedure advances to step 210. A warning may also be provided by producing sounds, or vibrating the camera.

In step 210, it is determined whether the timer started in step 208 has expired. If it is determined that the timer has not expired, the procedure returns to step 209, in which the blinking of the correction amount identification mark is continued.

On the other hand, if it is determined in step 210 that the timer has expired, the procedure advances to step 207, in which the correction amount identification mark is turned off.

Thus, since the correction amount identification mark is displayed only when the correction confirmation button 2 is pressed, it is possible to eliminate inconvenience which would have been caused when the correction amount identification mark is displayed every time.

Embodiment 3

A method according to this embodiment for displaying a correction amount identification mark corresponding to a focus detection area is described with reference to the flowchart of FIG. 9. It should be noted that the camera system of this embodiment has the same structure as Embodiment 1, so that components that are same as those in Embodiment 1 are given the same reference numerals and their description has been omitted.

In step 301 in FIG. 9, it is detected whether the focus detection area selection switch 228 is turned ON. If it is determined that the focus detection area selection switch 228 is not turned ON (in OFF state), the detection is repeated until the focus detection area selection switch 228 is turned ON. On the other hand, if it is determined the focus detection area selection switch 228 is turned ON, the procedure advances to step 302.

In step 302, it is detected whether the main electronic dial 226 has been operated. If the main electronic dial 226 has been operated, the operated direction and the operated amount are detected.

In step 303, the superimposed display of the focus detection areas 50 to 94 in the viewfinder visual field which are already described in FIGS. 4A and 4B is changed in accordance with the operated direction and the operated amount of the main electronic dial 226 detected in step 302. The selection order is as follows: all, focus detection area 50, focus detection area 51 . . . focus detection area 94, all.

In step 304, it is determined whether the AF correction amount has been calculated in the focus detection area(s) selected in step 303. Then, if it is determined that the AF correction amount has been calculated, the procedure advances to step 305, in which the superimposed display is turned on.

On the other hand, if it is determined in step 304 that the AF correction amount has not been calculated, the procedure advances to step 306, in which the blinking of the superimposed display is performed.

Here, a specific displaying method of steps 305 and 306 is described with reference to FIGS. 10A and 10B.

Figure 10A:
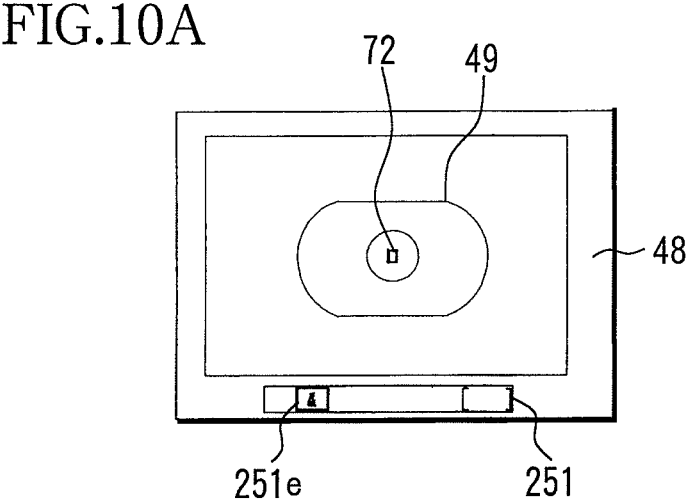
FIGS. 10A and 10B are diagrams showing how a focus detection area is selected in the digital camera according to Embodiment 1 of the present invention.

FIG. 10A shows a state in which a focus detection area for which the AF correction amount has been calculated is selected. As shown in FIG. 10A, the focus detection area 72 is turned on, and, furthermore, the correction amount identification mark 251e is also turned on.

Figure 10B:
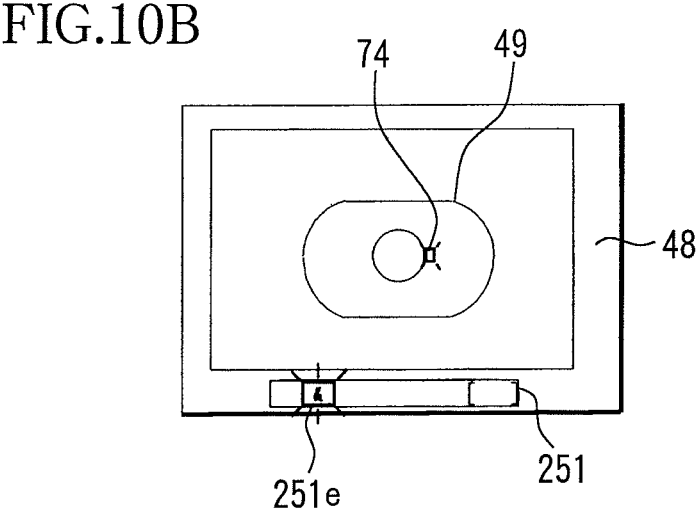

Further, FIG. 10B shows a state in which a focus detection area for which the AF correction amount has not been calculated is selected. As shown in FIG. 10B, the focus detection area 74 is displayed in a blinking state, and, furthermore, the correction amount identification mark 251e is also displayed in a blinking state.

In FIG. 9, after completion of steps 305 and 306, the procedure advances to step 307, in which it is determined whether the focus detection area selection switch 228 is turned ON. Then, if it is determined that the focus detection area selection switch 228 is turned ON, the procedure returns to step 302 and the above-described operations are repeated, because the focus detection area selection sequence is still being executed.

On the other hand, if it is determined in step 307 that the focus detection area selection switch 228 is not turned ON (in OFF state), the procedure terminates the focus detection area selection sequence.

As described above, the focus detection area and the correction amount identification mark blinks when a focus detection area for which the AF correction amount has not been calculated is selected, so that the photographer can readily recognize that a focus detection area for which the AF correction amount has not been calculated is selected. It should be noted that although whether the AF correction is performed is determined by lighting or blinking the focus detection area and the correction amount identification mark in this embodiment, this may also be done by changing the color of the focus detection area and the correction amount identification mark.

Embodiment 4

Simultaneous recording of a correction amount identification mark and an image file according to Embodiment 4 of the present invention is described with reference to FIGS. 11A and 11B.

In step 401, it is determined whether the release SW1 (231) is turned ON. If it is determined that the release SW1 (231) is turned ON, the procedure branches to step 402 of determining the image-taking exposure and to step 404.

In step 402, photometry is performed on a light flux which has passed through the image-taking lens 101, been reflected by the quick-return mirror 202 and passed through the pentaprism 201, with the photometry circuit 207. In step 403, the system controller 223 determines the exposure amount during image-taking in accordance with the output from the photometry circuit 207.

In step 404, the system controller 223 performs focus detection, using the AF sensor unit 204 and the focus detection circuit 205.

In step 405, the system controller 223 determines whether it was possible to detect the focus state. When the object on which focus detection was performed is low-contrast or dark, it may not be possible to detect the focus state. If it was possible to detect the focus state, the procedure advances to step 406, in which a warning is provided.

In step 407, the system controller 223 receives lens ID information, and it determines whether the AF correction amount (CAL data) of the focus detection area used in focus detection which corresponds to the lens apparatus mounted on the digital camera 200 (as determined from the lens ID) is stored in the EEPROM. If it determines that the AF correction amount (CAL data) is not stored, then no AF correction amount is added to the result of focus detection. If it determines that the AF correction amount (CAL data) is stored, then the AF correction amount (CAL data) is added to the result of focus detection in step 409, and the procedure advances to step 410.

If the AF correction data (CAL data) is already present, the lens driving amount is as follows:

Lens driving amount=focus detection result+AF correction amount(adjustment data)during manufacturing+AF correction amount(CAL data)

In step 410, based on the result of focus detection, the system controller 223 transmits a lens driving amount to the lens control circuit 104, and the lens control circuit 104 controls the lens driving mechanism 103 based on the transmitted lens driving amount. Then, the lens driving mechanism 103 drives the image-taking lens 101 to an in-focus position.

In step 411, it is determined whether the release SW2 (230) is turned ON. If it is determined that the release SW2 (230) is turned ON, the procedure advances to step 412.

In step 412, the system controller 223 controls the shutter charge-mirror driving mechanism 211 such that the quick-return mirror 202 and the sub mirror 203 are moved up so as to be retracted from the image-taking optical path.

In step 413, the system controller 223 transmits the aperture value information set in step 403 to the aperture control circuit 106, and drives the aperture driving mechanism 105 to narrow down the aperture value to the set value. Then, the procedure advances to step 414.

In step 414, the system controller 223 controls various sections to open the focal plane shutter 208. Further, in step 415, the system controller 223 directs the image data controller (DSP) 220 to perform charge accumulation on the image-pickup element 210. In step 416, the procedure waits for a predetermined time. Then, after the predetermined time is over, the procedure advances to step 417, in which the focal plane shutter 208 is closed.

In step 418, the system controller 223 carries out the charging operation of the focal plane shutter 208 and the operation of moving the mirrors down, in preparation for the next image-taking operation. In step 419, the aperture stop is driven to the open position.

In step 420, the system controller 223 directs the image data controller 220 to read image data from the image-pickup element 210.

In step 421, the image data read from the image-pickup element 210 is compressed with the image compression circuit 219, and the image data and the correction amount identification mark are stored in the recording medium 218 in association with each other.

Figure 11A:
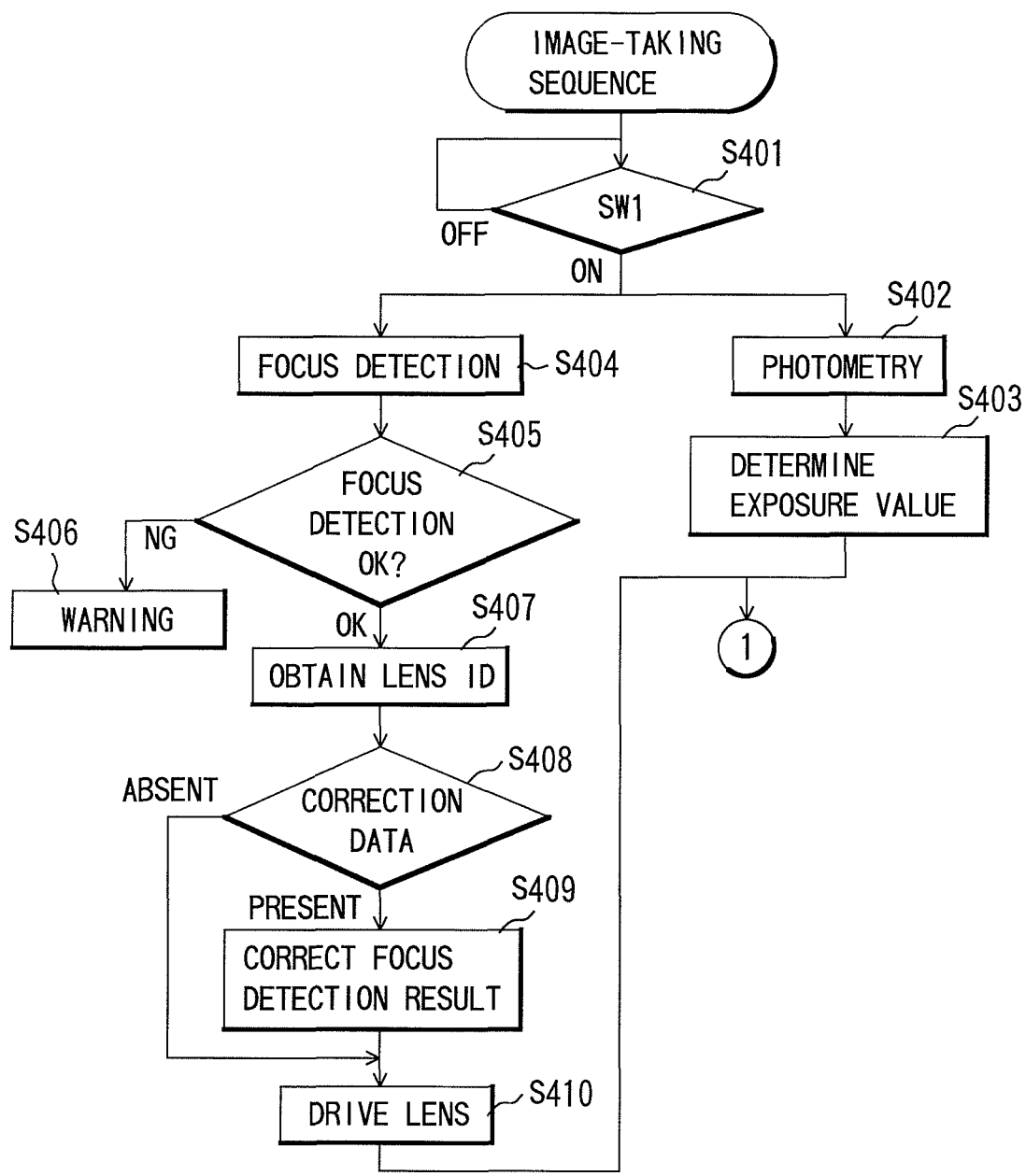
FIGS. 11A and 11B are flowcharts showing an image-taking sequence of the digital camera according to Embodiment 1 of the present invention.
Figure 11B:
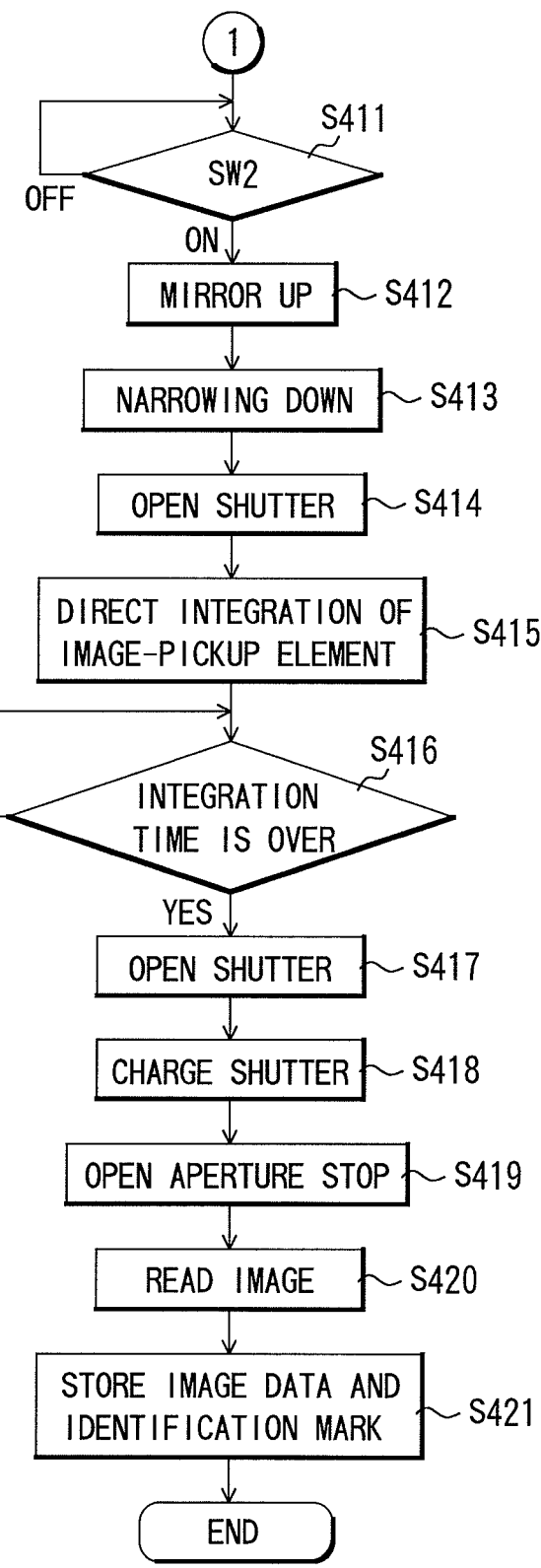
Figure 12A:
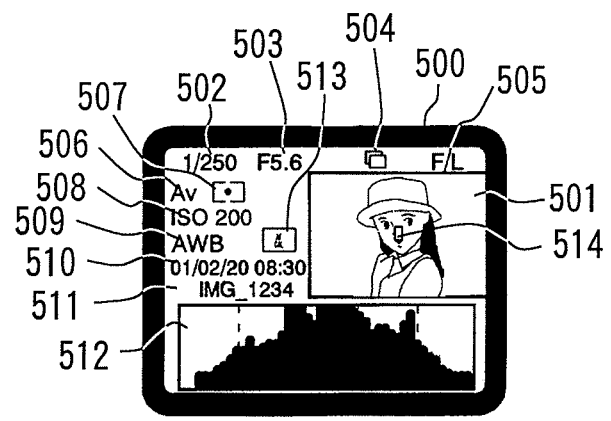
FIGS. 12A and 12B are diagrams showing how an identification mark is displayed in a reproduced image on the digital camera according to Embodiment 1 of the present invention.
Figure 12B:
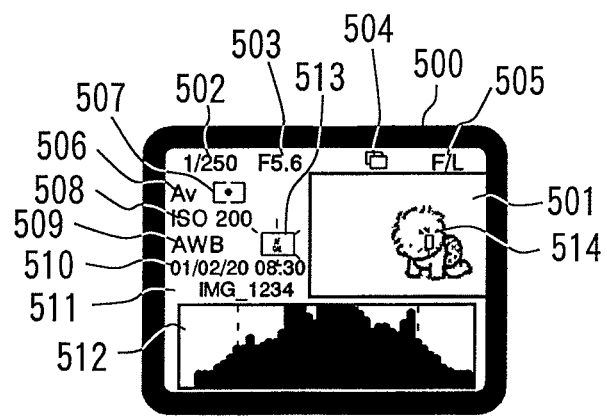

Here, the display state in the case where the image data described in FIGS. 11A and 11B is reproduced is described in detail with reference to FIGS. 12A and 12B. FIGS. 12A and 12B are diagrams showing the state when obtained images are reproduced on the LCD monitor unit 213. In FIGS. 12A and 12B, reference numeral 501 denotes an image reproduced on the LCD monitor unit 213.

In addition, together with the obtained images, a shutter speed 502, an aperture value 503, an image-taking mode 506, a photometry mode 507, an ISO sensitivity 508, a white balance mode 509, an image-taking date/image-taking time 510, a file number 511, a recording image quality 505, a histogram 512 and a correction amount identification mark 513 are displayed on the LCD monitor unit 213 as the image-taking information. Furthermore, reference numeral 514 indicates a focus detection area selected as described in FIG. 9 which is superimposed with red.

FIG. 12A shows a state in which an image taken in a focus detection area for which the AF correction amount has been calculated is reproduced. In this case, the focus detection area 514 and the correction amount identification mark 513 are turned on.

On the other hand, FIG. 12B show a state in which an image obtained in a focus detection area for which the AF correction amount has not been calculated is reproduced. In this case, the focus detection area 514 and the correction amount identification mark 513 are displayed in a blinking state.

Thus, by storing the correction amount identification mark and the obtained image in association with each other, it is possible to blink the focus detection area 514 and the correction amount identification mark 513 at the time of reproduction in the case where the image was obtained in a focus detection area for which the AF correction amount has not been calculated, thus allowing the photographer to easily recognize this.

It should be noted that although whether the image was obtained in a focus detection area for which the AF correction amount has not been calculated is indicated by lighting or blinking the focus detection area 514 and the correction amount identification mark 513 in this embodiment, it is also possible to allow the photographer to recognize this by changing their colors.

As described above, with the present invention, it is possible to determine whether information on accessories (e.g., a lens apparatus and an illumination apparatus) mounted on the camera, i.e., information used when performing a control corresponding to the accessory is stored in a storage section. Then, a signal corresponding to the result of the determination, including, for example, an image signal, an audio signal, a signal causing vibration and a combination of these signals, is output, so that it is possible to readily determine whether the information on the accessory is stored in the storage section based on this signal.

Furthermore, by using, as the above-described information, correction information for correcting a calculation result for control in accordance with the accessory, it is possible to readily determine whether the correction information which is necessary for the accessory is stored in the storage section based on a signal corresponding to the result of the determination.

Further, by letting the controller perform operations to obtain correction information in a state in which an accessory is mounted on the camera, and storing the obtained correction information in the storage section in association with the accessory, it is possible to reliably store the correction information corresponding to the accessory in the storage section.

Additionally, by providing a display unit which provides a display based on a signal, it is possible to visually determine whether the information on the accessory is stored in the storage section, with accuracy.

Further, in the present invention, an accessory mounted on the camera is identified. Then, whether information corresponding to the identified accessory, i.e., information used when performing a control corresponding to the accessory is stored in a storage section, and image data obtained by the camera using the accessory and the result of the determination are recorded in a recording medium in association with each other. Accordingly, it is possible to store the presence or absence of information corresponding to the accessory and the obtained image data in relation to each other. This makes it possible to determine, at the time of reproducing the obtained image, whether the image was obtained in a state in which the correction was performed. In addition, since the presence or absence of the information corresponding to the accessory is recorded in the recording medium which stores data of obtained images, this information can be stored for a large number of obtained images in the camera system.

Further, by using, as the above-described information, correction information for correcting the result of the calculation for control in accordance with the accessory, the presence or absence of the correction information which is necessary in relation to the accessory can be stored in association with the obtained image data.

Further, by letting the controller perform operations to obtain correction information in a state in which an accessory is mounted on the camera, and storing the obtained correction information in association with the accessory in the storage section, it is possible to reliably store the correction information corresponding to the accessory in the storage section.

Furthermore, in the present invention, a lens apparatus mounted on the camera is identified, and it is determined whether correction information corresponding to the identified lens apparatus, that is, correction information for correcting a calculation result in focus adjustment control is stored in a storage section. Then, a signal corresponding to the result of the determination, such as a video signal, an audio signal or a signal which causes vibration, is output. Therefore, it is possible to determine based on this signal whether correction information for focus adjustment associated with the lens apparatus is stored in the camera system, so that image-taking can be performed in a favorable focus condition.

By letting the controller perform operations to obtain correction information in a state where a lens apparatus is mounted on the camera, and storing the obtained correction information in the storage section in association with the lens apparatus, it is possible to reliably store the correction information necessary for focus adjustment in association with the lens apparatus.

Additionally, by providing a display unit which provides a display based on a signal, it is possible to visually determine the presence or absence of correction information for correcting a calculation result obtained by focus detection control corresponding to the lens apparatus.

The possibility of overlooking the presence or absence of the correction information can be reduced by changing the display format of the display unit.

The presence or absence of the correction information can be reliably displayed on the display unit before image-taking, by providing a detector which detects the mounted state of the lens apparatus on the camera, and letting the controller perform the above-described determination if the detector detects that the lens apparatus is mounted.

The presence or absence of the correction information can be displayed on the display unit based on the intention of the user, by providing an operation unit which lets the controller perform the above-described determination in accordance with the operation by the user. That is, the photographer can check the display unit only when he or she wishes to do so, and the presence or absence of the correction information is not displayed on other occasions. This eliminates inconvenience which would have been caused when the presence or absence of correction information is displayed every time, so that the photographer can concentrate on image-taking.

If the correction information is not stored in the storage section, it is possible to reliably allow the user to recognize that the correction information is not stored, by providing a warning display with the display unit.

By providing a focus selection unit which selects between manual focus and autofocus, and performing the above-described determination only when autofocus is selected, a warning display is not provided every time during manual focusing, so that the photographer can concentrate on focusing.

Since the image-taking operation of the camera is restricted if it is determined that the correction information is not stored in the storage section, it is possible to disable image-taking when the focus is displaced.

Furthermore, in the present invention, a lens apparatus mounted on the camera is identified, and whether correction information corresponding to the identified lens apparatus is stored in the storage section. Then, image data obtained with the camera using the lens apparatus and the result of the determination are recorded in association with each other in the recording medium. Accordingly, the presence or absence of information corresponding to the lens apparatus and the obtained image data can be stored in relation to each other. This makes it possible to determine, at the time of reproducing the obtained image, whether the image was taken in a state in which the correction for focus adjustment was performed. In addition, since the presence or absence of the correction information is recorded in the recording medium which stores obtained image data, this information can be stored for a large number of obtained images in the camera system.

Further, by letting the controller perform operations to obtain correction information in a state in which a lens apparatus is mounted on the camera, and storing the obtained correction information in association with the lens apparatus in the storage section, it is possible to reliably store the correction information in the storage section.

By providing a display unit which displays obtained image data recorded in the recording medium and letting the display unit display the result of the determination together with the obtained image data, it is possible to determine, at the time of reproducing the obtained image, whether the image was taken in a state in which focus adjustment was performed.

Embodiment 5

Figure 13:
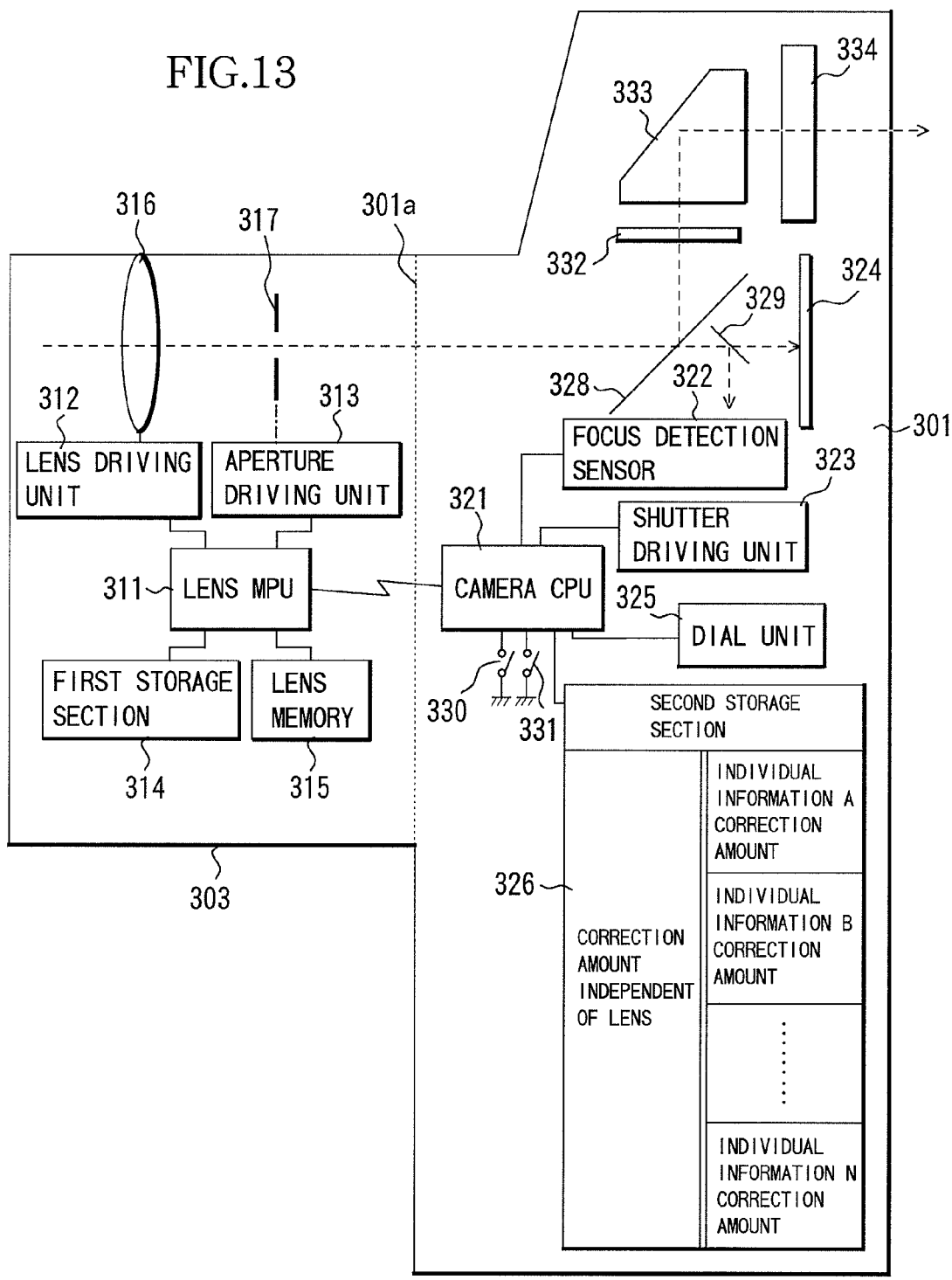
FIG. 13 is a functional block diagram of a camera system according to Embodiment 5 of the present invention.

FIG. 13 is a functional block diagram of a camera system according to Embodiment 5 of the present invention. In FIG. 13, reference numeral 301 denotes a camera, and a lens apparatus 303 capable of zooming is mounted at the center on the front of the camera 301, via a mount 301a indicated by the dashed line.

First, the structure of the lens apparatus 303 is described. Reference numeral 311 denotes a lens MPU (micro processing unit), 312 denotes a lens driving unit for driving an image-taking lens 316 in the optical axis direction, and 313 denotes an aperture driving unit for opening and closing aperture blades 317 in a plane substantially orthogonal to the optical axis. Additionally, in FIG. 13, the solid lines connecting the blocks indicate electrical connection, and the dotted lines indicate mechanical connection.

Reference numeral 314 denotes a first storage section constituted by an EEPROM (electrically erasable and programmable read only memory) serving as an electrically rewritable nonvolatile memory. The first storage section 314 stores a correction amount (fourth information) obtained by mounting the lens apparatus 303 on a reference camera described below. The details of the fourth information will be described later.

Reference numeral 315 denotes a lens memory which stores individual information assigned to each individual lens apparatus. In this embodiment, a model number specifying the model of a lens apparatus and a serial number of each lens apparatus are used as the individual information. It is also possible to provide a memory in the lens MPU 311, and to store the above-described individual information in the memory. Here, the individual information can be any information which can specify each individual lens apparatus. For example, instead of using the model number, it is possible to use a serial number which is unique across all models, or a unique number such as a channel.

Next, the structure of the camera 301 is described. Reference numeral 321 denotes a camera MPU which can communicate with the lens MPU 311. The camera MPU 321 can obtain, from the lens MPU 311, the correction amount stored in the first storage section 314 and the individual information of the lens apparatus mounted on the camera 301.

Reference numeral 322 denotes a focus detection sensor for detecting a defocus amount used for focus control of the image-taking lens, using a light flux entering the image-taking lens, and 323 denotes a shutter driving unit which drives a shutter (not shown).

Reference numeral 324 denotes an image-pickup element (e.g., a CCD sensor and a CMOS image sensor) which generates an image signal by photoelectrically converting a light flux entering the image-taking lens. Reference numeral 325 denotes a dial unit for setting various settings (e.g., the shutter speed, the aperture value and the image-taking mode) of the camera.

Reference numeral 326 denotes a second storage section constituted by an EEPROM (electrically erasable and programmable read only memory) serving as an electrically rewritable nonvolatile memory. The second storage section 326 stores a correction amount (third information) obtained by mounting a reference lens apparatus (a specific lens apparatus) described below on the camera 301, individual information of a plurality of lens apparatuses selectively mounted on the camera 301, and a correction amount (second information) associated with the individual information of each of the lens apparatuses.

More specifically, the second storage section 326 stores correction amounts corresponding to a plurality of lens apparatuses which can be mounted on the camera 301. For example, it stores individual information A and a correction amount associated with the individual information A, individual information B and a correction amount associated with the individual information B . . . individual information N and a correction amount associated with the individual information N.

Reference numeral SW1 (330) denotes a switch which is turned ON by a first stroke operation of (half pressing) a release button (not shown), and SW2 (331) denotes a switch which is turned ON by a second stroke operation of (fully pressing) the release button (not shown).

When the SW1 is turned ON, the focus detection sensor 322 is driven, and a focus detection operation is started. When the SW2 is turned ON, exposure of the image-pickup element 324 and recording of the image signal photoelectrically converted with the image-pickup element 324 in a recording medium (not shown) are started.

The defocus amount, that is the difference between the image-forming position of the image-taking lens and the position of the image surface at which the image-taking operation is performed, necessary for autofocus adjustment is calculated from the displacement amount (prediction amount) of two images formed respectively by light fluxes from the object which pass through two different areas flanking the optical axis of the image-taking lens.

Specifically, the light fluxes of the two images pass through a main mirror 328 which is formed as a half mirror and disposed obliquely in an image-taking optical path, then reflected toward a lower position of the camera 301 by a sub mirror 329 disposed on the image surface side with respect to the main mirror 328, and guided to the focus detection sensor 322 by a focus detection optical system (not shown). Incidentally, the light fluxes reflected by the main mirror 328 form image on a focusing screen 332, and the image is observed through a pentamirror 333 and a viewfinder lens 334.

The focus detection sensor 322 serves as a photoelectrical conversion element, from which the camera MPU 321 reads signals of the two images and calculates the displacement amount of the images by performing correlation calculation, thereby determining a defocus amount.

The autofocus adjustment is carried out in the above-described manner. However, the image-taking optical system of the lens apparatus varies depending on the model, so that even when the object is at an in-focus position, the defocus amount is not necessarily 0, depending on the model of the lens apparatus. Further, even when the design defocus amount is 0, the defocus amount is not necessarily 0 for every individual lens apparatus because of the discrepancy of the image-taking optical system.

For this reason, the defocus amount is measured in advance using a pre-adjusted reference camera in a state in which focus has been achieved on a light-receiving surface of the image-pickup element 324 in a lens calibration step at the factory. This defocus amount is stored as the correction amount in the first storage section 314 of the lens apparatus 303, as described above.

In an actual operation, the camera MPU 321 communicates with the lens MPU 311 at the time of autofocus adjustment, obtains the correction amount stored in the first storage section 314 through communication, and subtracts this correction amount from the defocus amount detected with the focus detection sensor 322.

Similarly, due to the discrepancy of the focus detection optical system, the defocus amount is not necessarily 0 for every camera even when the object is at an in-focus position. For this reason, the defocus amount is measured in advance using a pre-adjusted reference lens in a state in which focus has been achieved on a light-receiving surface of the image-pickup element 324 in a camera calibration step at the factory. Then, this defocus amount is stored as a correction amount in the second storage section 326 in the camera 301, as described above.

Specifically, the flange focal length (the distance from a surface of the mount 301*a* to the light-receiving surface of the image-pickup element 324) of the camera is measured first, and the amount of deviation from the design value is determined. Next, a reference lens which has been focused in advance on a reference chart at a known distance is corrected by the amount of displacement of the flange focal length. Subsequently, the reference chart is placed at the center of the sensor, and the defocus amount is determined. This defocus amount is written as a correction amount in the second storage section 326.

In an actual operation, the camera MPU 321 reads the correction amount stored in the second storage section 326 at the time of autofocus adjustment, and subtracts this correction amount from the defocus amount detected by the focus detection sensor 322.

Figure 14:
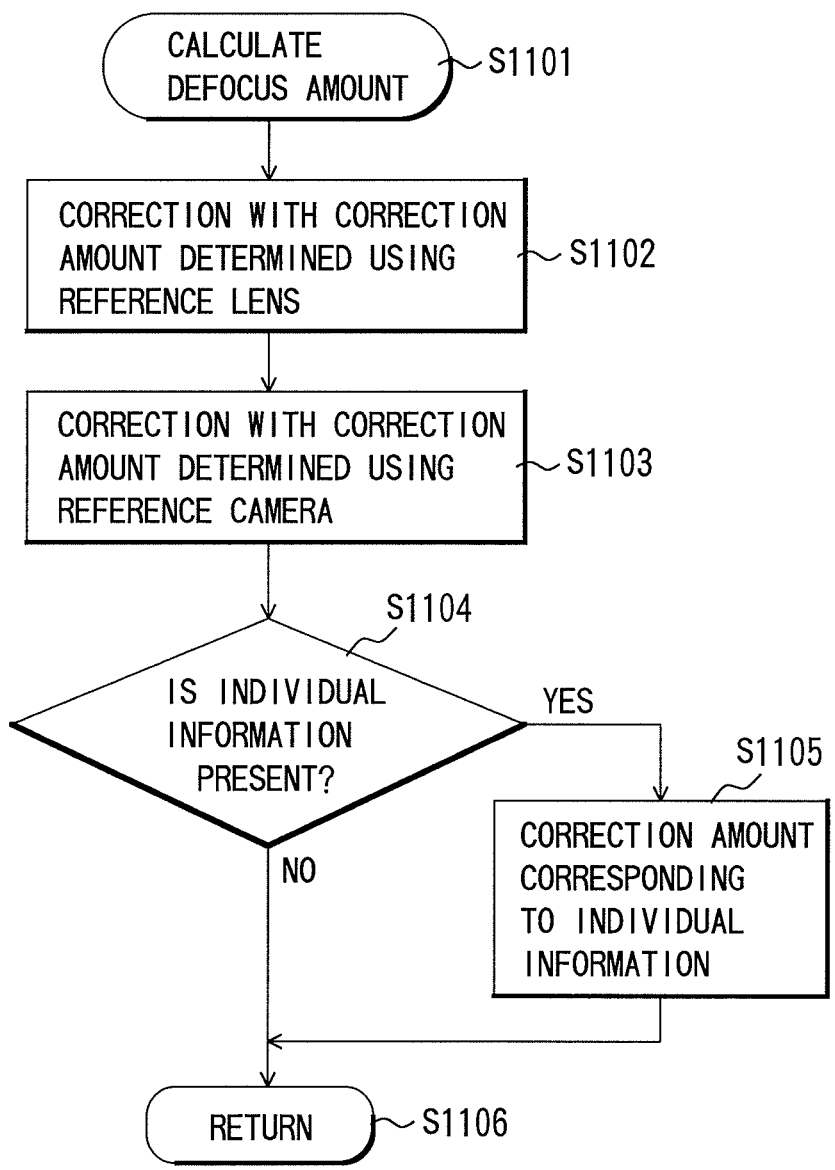
FIG. 14 is a flowchart showing the procedure of correcting a defocus amount of the camera system according to Embodiment 5 of the present invention.

In the following, the method for correcting a defocus amount of the camera system according to this embodiment is described with reference to the flowchart of FIG. 14.

First, in step S1101, the camera MPU 321 reads an object image from the focus detection sensor 322 and calculates a defocus amount. Here, examples of the method for detecting the defocus amount include phase difference detection and TV-AF method, and any of such methods may be used.

Next, in step S1102, the camera MPU 321 reads from the second storage section 326, the correction amount determined using the reference lens, and corrects the defocus amount obtained in step S1101.

Subsequently, in step S1103, by communicating with the lens MPU 311, the camera MPU 321 reads the correction amount determined using the reference camera and stored in the first storage section 314, and corrects the corrected defocus amount obtained in step S1102.

The procedure advances to step S1104, in which the camera MPU 321 reads the individual information by communicating with the lens MPU 311 and determines whether the individual information is stored in the second storage section 326 of the camera 301. If the individual information is stored, the procedure advances to step S1105, in which the camera MPU 321 reads from the second storage section 326, the correction amount stored in association with that individual information and corrects the defocus amount obtained in step S1103.

Thus, the defocus amount obtained with the focus detection sensor 322 is corrected with the correction amount determined using the reference camera and stored in the first storage section 314 and the correction amount determined using the reference lens and stored in the second storage section 326, and the result of this correction is further corrected with the correction amount corresponding to the individual information assigned to each individual lens apparatus. Therefore, even if a plurality of lens apparatuses of the same model is selectively mounted on the camera, it is possible to perform correction corresponding to the mounted lens apparatus. This makes it possible to improve the focusing accuracy of the image-taking lens. On the other hand, if the individual information is not stored in the second storage section 326, the camera MPU 321 does not perform any correction, and the procedure advances to step S1106, terminating the correction process of the defocus amount.

Embodiment 6

Figure 15:
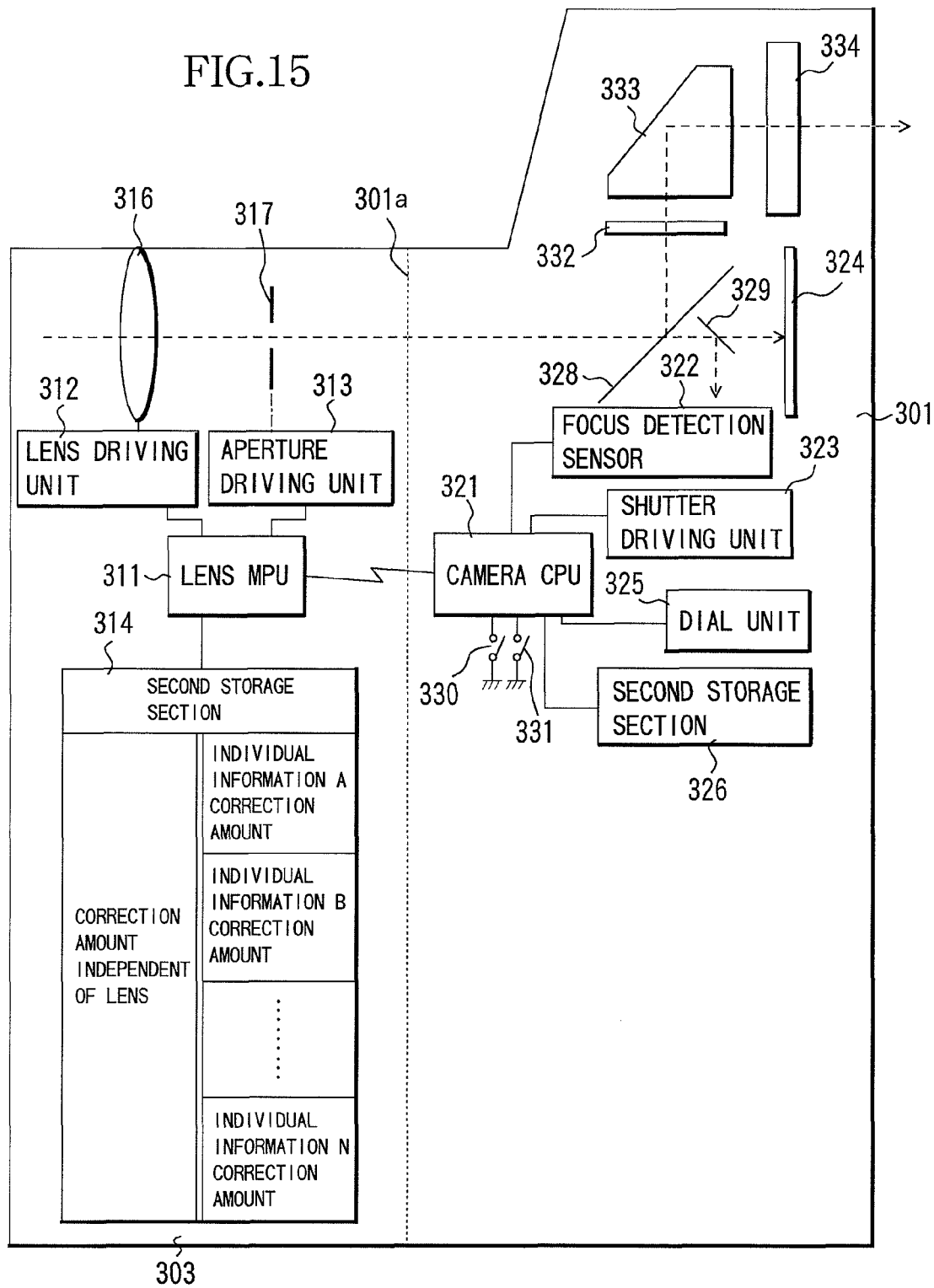
FIG. 15 is a functional block diagram of a camera system according to Embodiment 6 of the present invention.

FIG. 15 is a functional block diagram of a camera system according to this embodiment. The structural components that are the same as those of Embodiment 5 are given the same reference numerals, and their description has been omitted.

The camera system of this embodiment is different from that of Embodiment 5 in that the lens MPU 311 corrects the defocus amount, using individual information of the camera.

Reference numeral 327 denotes a camera memory which stores individual information provided to each individual camera. In this embodiment, a camera model number specifying the model of a camera and a camera serial number specifying an individual camera which belongs to the camera model number are used as the individual information. Similarly to Embodiment 5, it is possible to use any information, as long as it can specify each individual camera. Additionally it is also possible to provide a memory in the camera MPU 321, and to store the above-described individual information in the memory.

The first storage section 314 of the lens apparatus 303 stores a correction amount obtained by mounting the lens apparatus 303 on a reference camera, individual information of a camera on which the lens apparatus 303 can be mounted, and a correction amount associated with the individual information. The second storage section 326 of the camera 301 stores a correction amount obtained by mounting a reference lens on the camera 301.

In the following, a method for correcting the defocus amount of the camera system according to this embodiment is described.

First, the lens MPU 311 reads an object image from the focus detection sensor 322 and calculates a defocus amount. Here, examples of the method for detecting the defocus amount include phase difference detection and TV-AF method, and any of such methods may be employed.

Then, the lens MPU 311 reads from the second storage section 326, the correction amount determined using the reference lens and corrects the above-described defocus amount detected with the focus detection sensor 322. Thus far, the correction method is the same as in Embodiment 5.

Figure 16:
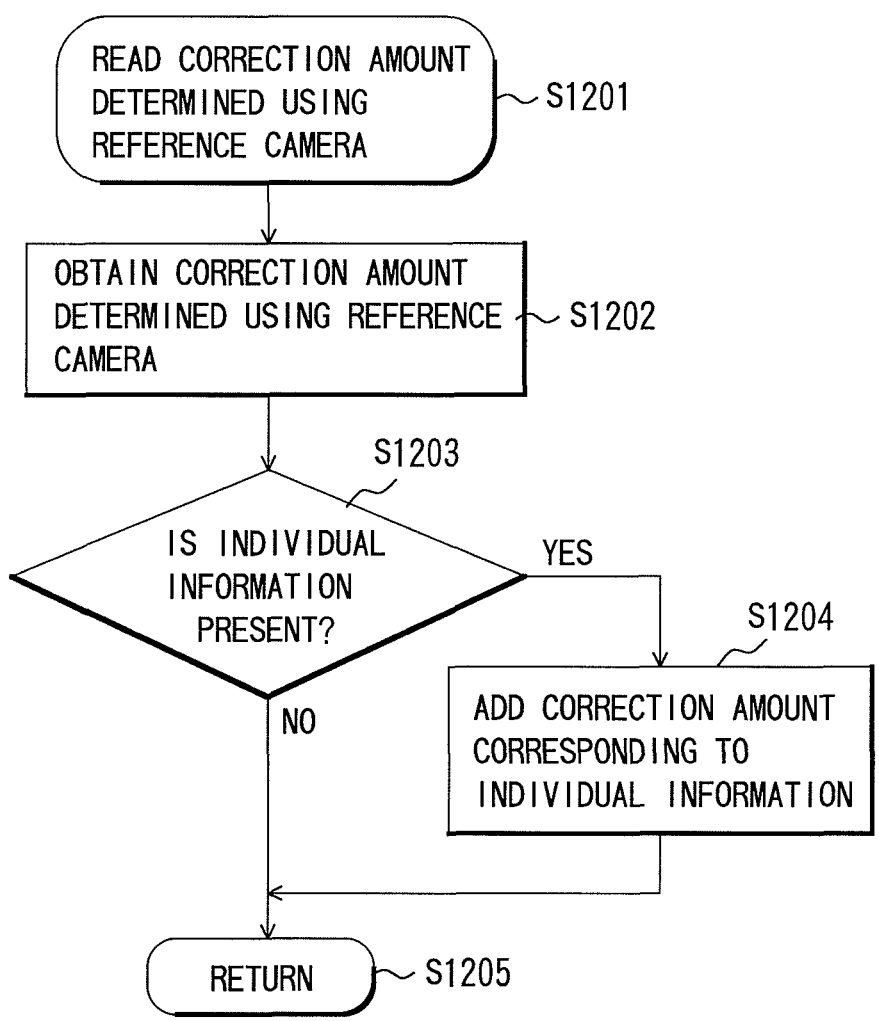
FIG. 16 is a flowchart showing the procedure of correcting a defocus amount of the camera system according to Embodiment 6 of the present invention.

Next, the lens MPU 311 further corrects the corrected defocus amount in accordance with the flowchart shown in FIG. 16. More specifically, in step S1201, the lens MPU 311 reads the correction amount determined using the reference camera and stored in the first storage section 314, and obtains the read correction amount by communication in step S1202. At this time, the lens MPU 311 does not perform the above-described process of correcting the corrected defocus amount using the correction amount obtained by communication, and the procedure advances to step S1203.

In step S1203, the lens MPU 311 reads the individual information stored in the camera memory 327 by communicating with the camera MPU 321, and determines whether the individual information is stored in the first storage section 314. If the individual information is stored in the first storage section 314, the procedure advances to step S1204, in which the lens MPU 311 reads from the first storage section 314, the correction amount stored in association with the individual information and adds this correction amount to the correction amount obtained in step S1202. Accordingly, it is possible to obtain an effect similar to that of Embodiment 5.

On the other hand, if the individual information is not stored, the lens MPU 311 adds nothing to the correction amount obtained in step S1202, and the procedure advances to step S1205, in which the lens MPU 311 corrects the defocus amount with the correction amount obtained in step S1202.

According to the present invention, it is possible to provide a camera capable of performing focus control of the image-taking lens, using the second information associated with individual information assigned to each individual lens apparatus mounted on the camera. This makes it possible to perform focus control corresponding to the individual information of each lens apparatus even in the case where a plurality of lens apparatuses which differ in individual information is selectively mounted on the camera, thus improving focusing accuracy.

Embodiment 7

Figure 17:
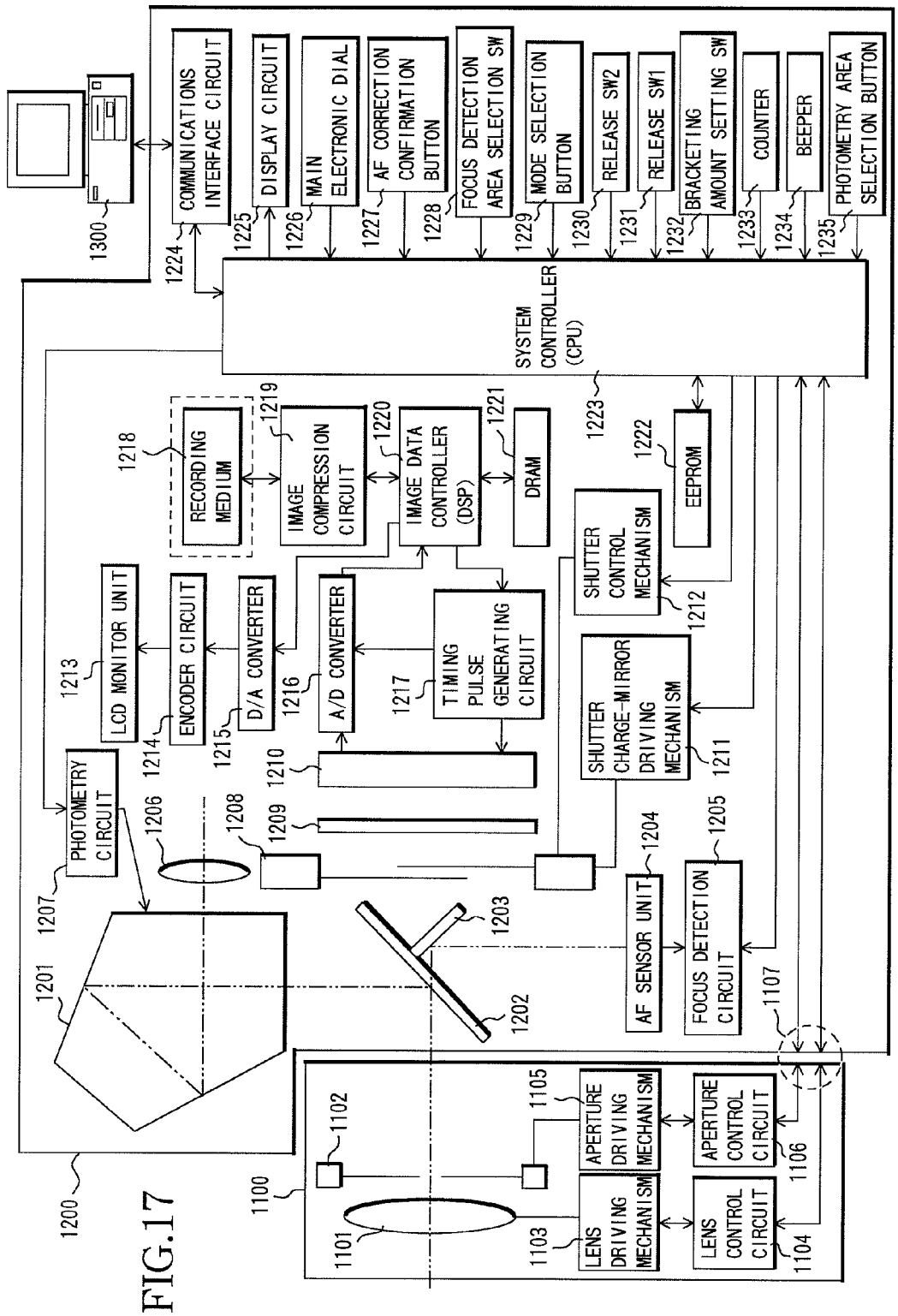
FIG. 17 is a block diagram showing the structure of a camera system according to Embodiment 7 of the present invention.

FIG. 17 is a block diagram showing the structures of an electronic camera 1200 and a lens apparatus 1100 of a camera system according to Embodiment 7 of the present invention.

As shown in FIG. 17, the lens apparatus 1100 is removably mounted on the electronic camera 1200 via a mount mechanism (not shown). A group of electrical contacts 1107 is provided to the mount mechanism, and communication is carried out between the electronic camera 1200 and the lens apparatus 1100 to drive an image-taking lens 1101 and an aperture stop 1102 in the lens apparatus 1100.

An image-taking light flux from an object is guided to a quick-return mirror 1202 via the image-taking lens 1101 and the aperture stop 1102 for adjusting the light quantity. The central part of the quick-return mirror 1202 is formed as a half mirror, through which a portion of the object light flux is transmitted at a position (the position shown in FIG. 17) where the quick-return mirror 1202 is moved down. Then, a portion of the object light flux transmitted through the quick-return mirror 1202 is reflected by a sub mirror 1203 disposed on the back surface of the quick-return mirror 1202, and guided to an AF sensor 1204.

The image-taking light flux reflected by the quick-return mirror 1202 reaches the eyes of the photographer, via a pentaprism 1201 and an eyepiece 1206.

Furthermore, when the quick-return mirror 1202 is moved up and the sub mirror 1203 is folded and moved up, the image-taking light flux from the image-taking lens 1101 reaches an image sensor 1210, which is typically a CMOS sensor or the like, serving as an image-pickup element, via a focal plane shutter 1208 which is a mechanical shutter, and a filter 1209. The filter 1209 has the following two functions. One is to block infrared rays and to guide only visible rays to the image sensor 1210. The other is to serve as an optical low-pass filter which blocks high-frequency components of the object light. In addition, the focal plane shutter 1208 includes a front curtain and a rear curtain, and transmits and blocks the light flux from the image-taking lens 1101.

The electronic camera 1200 is provided with a system controller 1223 constituted by a CPU for controlling the entire electronic camera 1200, and appropriately control the operation of each of the section described later.

The system controller 1223 is connected to: a lens control circuit 1104 which controls a lens driving mechanism 1103 for performing focusing by moving the image-taking lens 1101 in the optical axis direction; an aperture control circuit 1106 which controls an aperture driving mechanism 1105 for driving the aperture stop 1102; a shutter charge-mirror driving mechanism 1211 which controls the driving of the up and down movements of the quick-return mirror 1202 and the driving of the shutter charge of the focal plane shutter 1208; a shutter control circuit 1212 for controlling the movement of the front curtain and the rear curtain of the focal plane shutter 1208; a photometry circuit 1207 for performing auto exposure control which is connected to a photometry sensor (not shown) provided in the vicinity of the eyepiece 1206; and an EEPROM 1222 which stores parameters necessary to be adjusted to control the electronic camera 1200, camera ID information which enables individual identification of the electronic camera 1200, AF correction data adjusted with a reference lens, auto exposure compensation values and the like. Additionally, the system controller 1223 controls AF (autofocus adjustment), AE (auto exposure adjustment) and the bracketing image-taking for white balance.

The lens control circuit 1104 is provided with a storage section which stores information unique to the individual lens, such as a focal length, open aperture value and a lens ID assigned to each individual lens, a lens type, manufacturer information, and a lens condition, as well as information received from the system controller 1223.

Furthermore, the electronic camera 1200 can be connected to an external control apparatus 1300, which is typically a personal computer (PC), and the external control apparatus 1300 and the system controller 1223 can communicate with each other via a communications interface circuit 1224.

Figure 18:
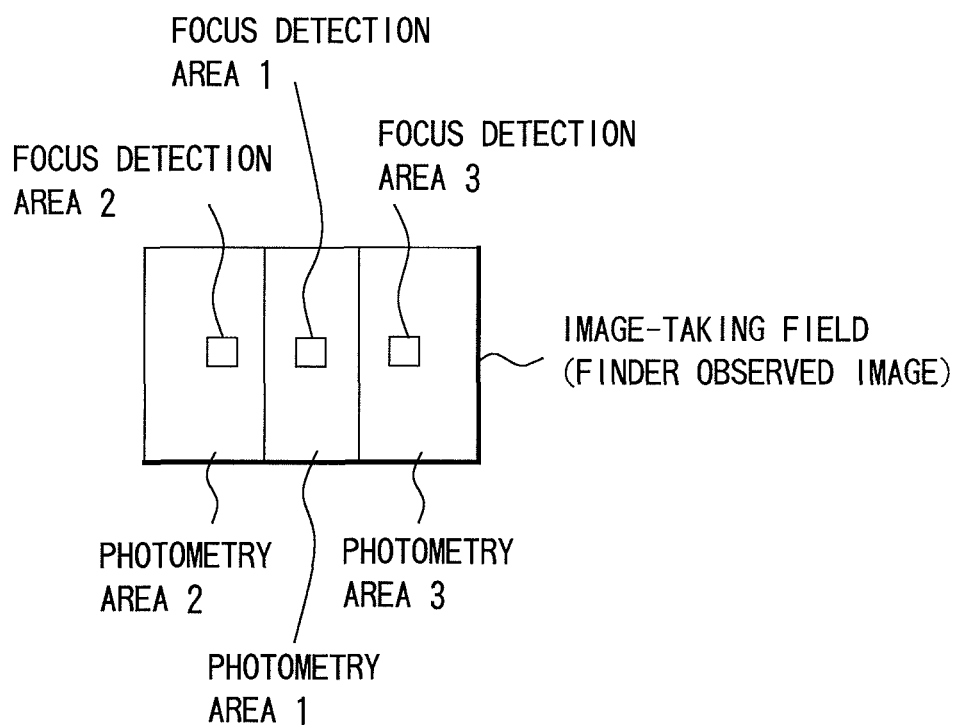
FIG. 18 is a diagram showing an image-taking field.

FIG. 18 is a diagram showing an image-taking field.

This image-taking field is also an image range observed from the viewfinder. The image-taking field is divided into, for example, three photometry areas 1, 2 and 3, and photometry is carried out for each of the divided areas. Furthermore, the three photometry areas 1, 2 and 3 include focus detection areas 1, 2 and 3, respectively, and focus detection is performed at three positions on the image-taking field with the AF sensor 1204 provided with three sensor sections corresponding respectively to these focus detection areas 1, 2 and 3.

In FIG. 17, the photometry sensor connected to the photometry circuit 1207 is a sensor for measuring the brightness of the object, and its output is supplied to the system controller 1223 via the photometry circuit 1207. The photometry section of the photometry sensor measures the light intensity in each of the photometry areas 1 to 3 shown in FIG. 18. The photometry circuit 1207 performs auto exposure adjustment.

Further, the system controller 1223 controls the lens driving mechanism 1103 via the lens control circuit 1104 to form an object image on the image sensor 1210. In addition, based on an Av value set in the image-taking mode described later, the system controller 1223 controls the aperture driving mechanism 1105 via the aperture control circuit 1106 to drive the aperture stop 1102 and also outputs a control signal to the shutter control circuit 1212, based on a set Tv value.

The driver of the front curtain and the rear curtain of the focal plane shutter 1208 is constituted by a spring, and it is necessary to charge the spring after a shutter movement for the subsequent operation. The shutter charge-mirror driving mechanism 1211 is configured so as to control this spring charging. The shutter charge-mirror driving mechanism 1211 also moves the quick-return mirror 1202 up and down.

The system controller 1223 is connected to an image data controller 1220. The image data controller 1220 constituted by a DSP (digital signal processor) performs, for example, the control of the image sensor 1210, and the correction or process of image data input from the image sensor 1210, in accordance with commands from the system controller 1223. The items of the correction/process of the image data include auto white balance. The auto white balance is the function of correcting a portion of an obtained image which has the highest brightness to a predetermined color (white). The correction amount for the auto white balance can be changed in accordance with commands from the system controller 1223.

The image data controller 1220 is connected to: a timing pulse generating circuit 1217 which outputs a pulse necessary for driving the image sensor 1210; an A/D converter 1216 for receiving a timing pulse generated with the timing pulse generating circuit 1217 and converting an analog signal corresponding to an object image output from the image sensor 1210 to a digital signal; a DRAM 1221 which temporarily stores the image data (digital data) obtained with the A/D converter 1216; a D/A converter 1215; and an image compression circuit 1219.

The DRAM 1221 temporarily stores image data before the image data is processed or converted to a predetermined format.

The D/A converter 1215 is connected to an image display circuit 1213 for displaying an image via an encoder circuit 1214. The image compression circuit 1219 is connected to an image data recording medium 1218.

The image display circuit 1213 is a circuit for displaying image data obtained with the image sensor 1210, and includes a color liquid crystal display device.

The image data controller 1220 reads image data on the DRAM 1221 and the read image data is converted into an analog signal with the D/A converter 1215 for output to the encoder circuit 1214. The encoder circuit 1214 converts the output from the D/A converter 1215 into a video signal (e.g., an NTSC signal) which is necessary at the time of driving the image display circuit 1213.

The image compression circuit 1219 is a circuit for performing compression or conversion (e.g., JPEG) of image data stored in the DRAM 1221. The converted image data is stored in the image data recording medium 1218. Examples of the image data recording medium 1218 include hard disks, flash memories and floppy (trademark) disks.

Furthermore, the system controller 1223 is connected to: a display circuit 1225 for displaying operation mode information, exposure information (e.g., a shutter speed and an aperture value) and the like of the electronic camera 1200; a release SW1 (1231) for starting a preparatory operation for image-taking, such as photometry and focus detection; a release SW2 (1230) for starting an image-taking operation, a mode setting switch 1229 with which the user sets a mode for letting the electronic camera 1200 execute a desired operation; a focus detection area selection switch 1228 for starting a process of selecting a focus detection area to be used from the three focus detection areas (focus detection positions) 1 to 3 corresponding to the three sensor sections of the AF sensor 1204; a determination switch 1227 for selecting an image, a bracketing amount setting switch 1232 for setting a bracketing amount; a photometry area selection switch 1235 for starting a process of selecting a photometry area to be used from the three photometry areas 1 to 3 shown in FIG. 18; and an electronic dial switch 1226 for increasing or decreasing parameters by rotating operation. A counter 1233 is a counter for counting the number of release times at the time of performing various modes of bracketing image-taking, and connected to the system controller 1223. The reset of a discrete value of the counter 1233 is performed with the system controller 1223.

In the following, the principle of the defocus amount (focus position displace amount) detection is described with reference to FIGS. 19A to 19C and FIG. 20.

Figure 19:
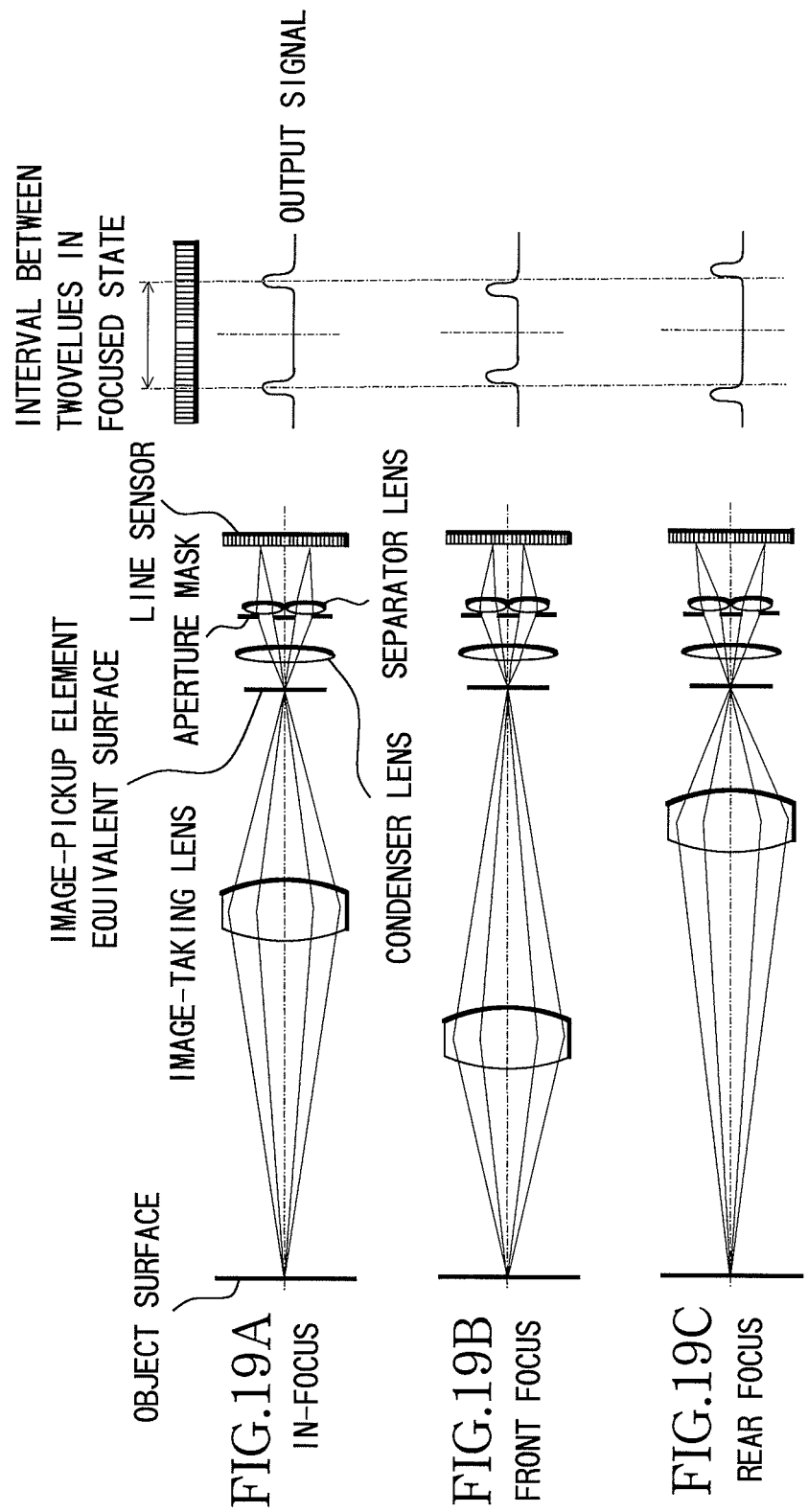
FIGS. 19A to 19C are diagrams showing the interval between two images on a line sensor in the focused state and in defocused states.

FIGS. 19A to 19C are diagrams showing the interval between two images on a line sensor in the focused state and the defocused state.

As shown in FIG. 19A, when focus is achieved on the image-pickup element (in-focus state), the interval between two images on the line sensor assumes a given value. Although this value can be determined in design, an actual value will not be the same as a design value because of the presence of variations in dimensions of parts, errors in assembly and the like. Therefore, the interval between two images in the focused state (reference interval between two images Lo) needs to be obtained by measurement. It should be noted that, as shown in FIGS. 19B and 19C, when the interval between two images is narrower than the reference interval between two images Lo, the focus state is front focus. When it is wider, the focus state is rear focus.

Figure 20:
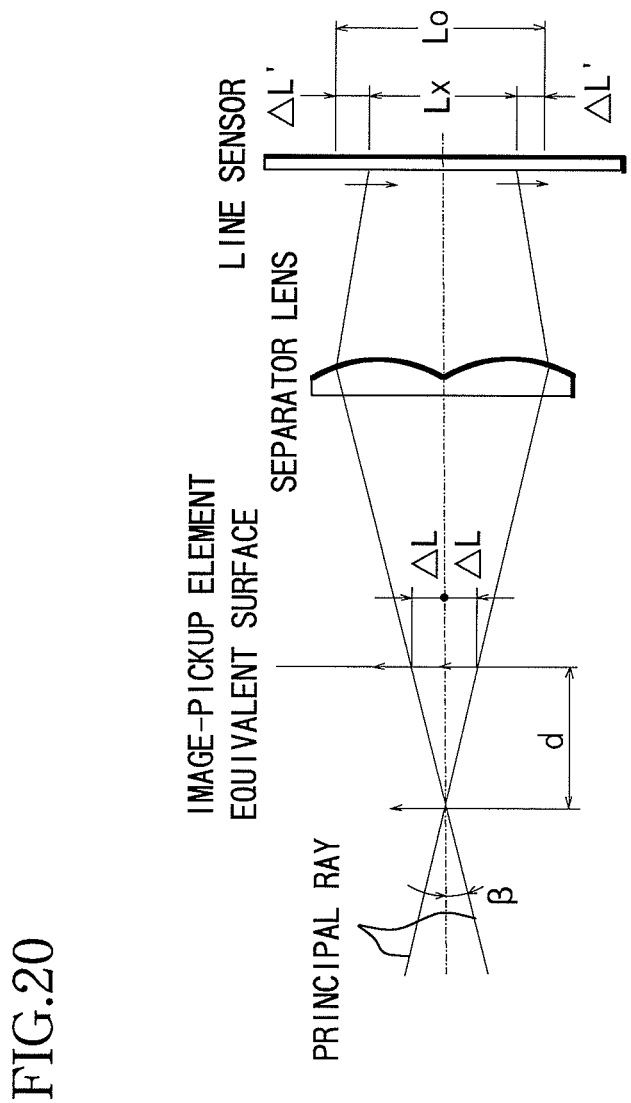
FIG. 20 is a diagram showing the interval between two images in a model which corresponds to an AF sensor module optical system from which a condenser lens has been omitted.

FIG. 20 is a diagram showing the interval between two images in a model which corresponds to the AF sensor module optical system shown in FIGS. 19A to 19C from which a condenser lens has been omitted.

As shown in FIG. 20, where $\theta$ represents the angle of the principal ray, $\beta$ represents the magnification of the separator lens, $\Delta L$ represents the movement amount of the image on an equivalent surface of the image-pickup element and $\Delta L'$ represents the movement amount of the image on the line sensor, the defocus amount "d" can be determined by the following Equation (1):

$$d = \Delta L / \tan \theta = \Delta L' / (\beta \cdot \tan \theta) \qquad (1)$$

where ($\beta \cdot \tan \theta$) represents a parameter determined in designing the AF sensor module.

The movement amount $\Delta L'$ can be determined from the reference interval of two images Lo and the present interval of two images Lx ($\Delta L' = Lo - Lx$).

Based on this principle of the defocus amount (focus position displacement amount) detection, the method performed in the camera system shown in FIG. 17 for correcting variations in focus position among individual image-taking lenses is described below.

Conventionally, in focus adjustment of autofocus function, an image-taking lens whose focus position has been already known is used, and a focus position is set at a position (a position including errors occurring at the time of mounting the image-pickup element) on the optical axis of the image-pickup element. Then, the interval between two images obtained from the AF sensor at that time is stored as an AF focus correction parameter in the EEPROM. However, in the case where a plurality of lens apparatuses are mounted on an electronic camera, variations occur in their focus positions, since manufacturing errors are present in the lens apparatuses themselves.

Therefore, in the system controller 1223 of the present invention, an AF calibration mode, which is a correction amount calculation mode of calculating and setting a correction amount for correcting the focus position, is used to calculate an AF correction amount for each individual lens apparatus based on information obtained from the AF sensor 1204 for performing focus detection and information concerning the lens apparatus mounted on the electronic camera 1200, thus making it possible to correct variations among the lens apparatuses.

Before describing the calculation of the AF correction amount and the correction of variations in focus position among the lens apparatuses, a focus detection area selection process and a photometry area selection process are described.

Figure 21:
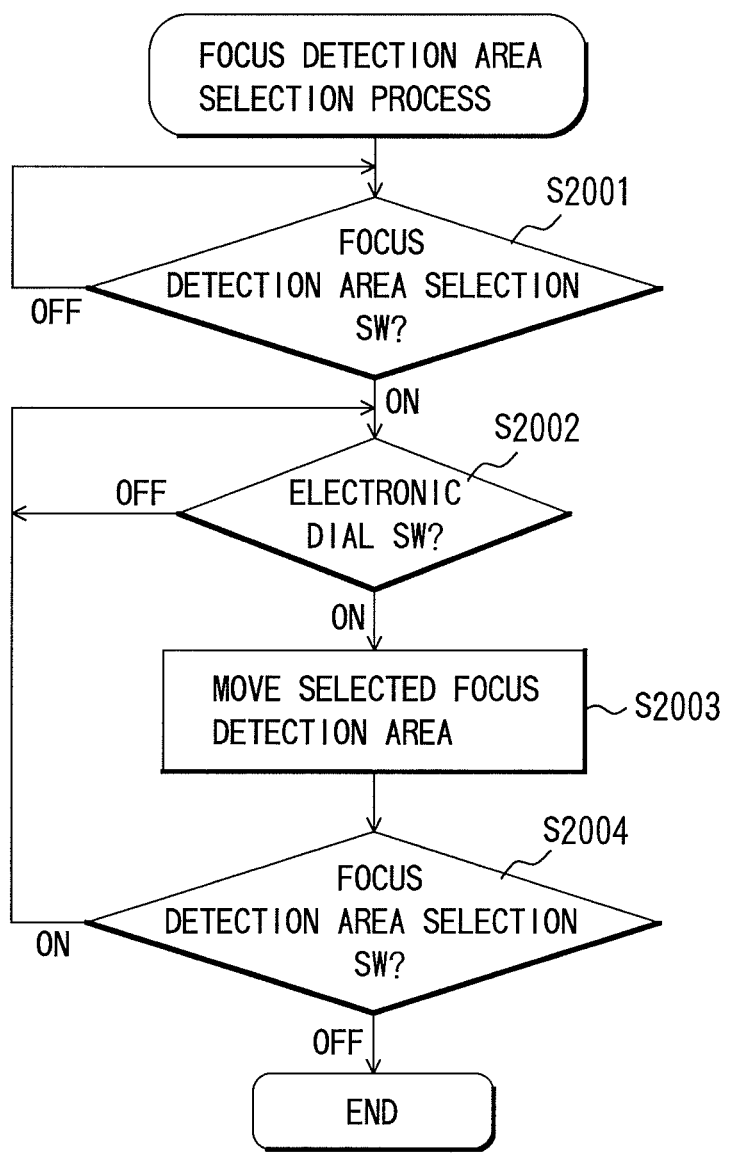
FIG. 21 is a flowchart showing the procedure of a focus detection area selection process executed with a system controller of an electronic camera.

FIG. 21 is a flowchart showing the procedure of the focus detection area selection process executed with the system controller 1223 of the electronic camera 1200.

In step S2001, the procedure waits until the focus detection area selection switch 1228 is turned ON. When it is turned ON, the procedure advances to step S2002.

In step S2002, the procedure waits until the electronic dial switch 1226 is operated. When it is operated, the procedure advances to step S2003.

In step S2003, in accordance with the operation of the electronic dial switch 1226, the focus detection area is switched to the subsequent area among the focus detection areas 1 to 3 shown in FIG. 18 in accordance with a switching order. The switching order is: all, focus detection area 1, focus detection area 2, focus detection area 3, all, or the reverse of this order, depending on the rotating direction of the electronic dial switch 1226. Each time the electronic dial switch 1226 is rotated, the area to be selected is switched in the above-described order.

In step S2004, it is determined whether the focus detection area selection switch 1228 is still ON, and the procedure returns to step S2002 if it is ON, and terminates the focus detection area selection process if it is not ON.

Figure 22:
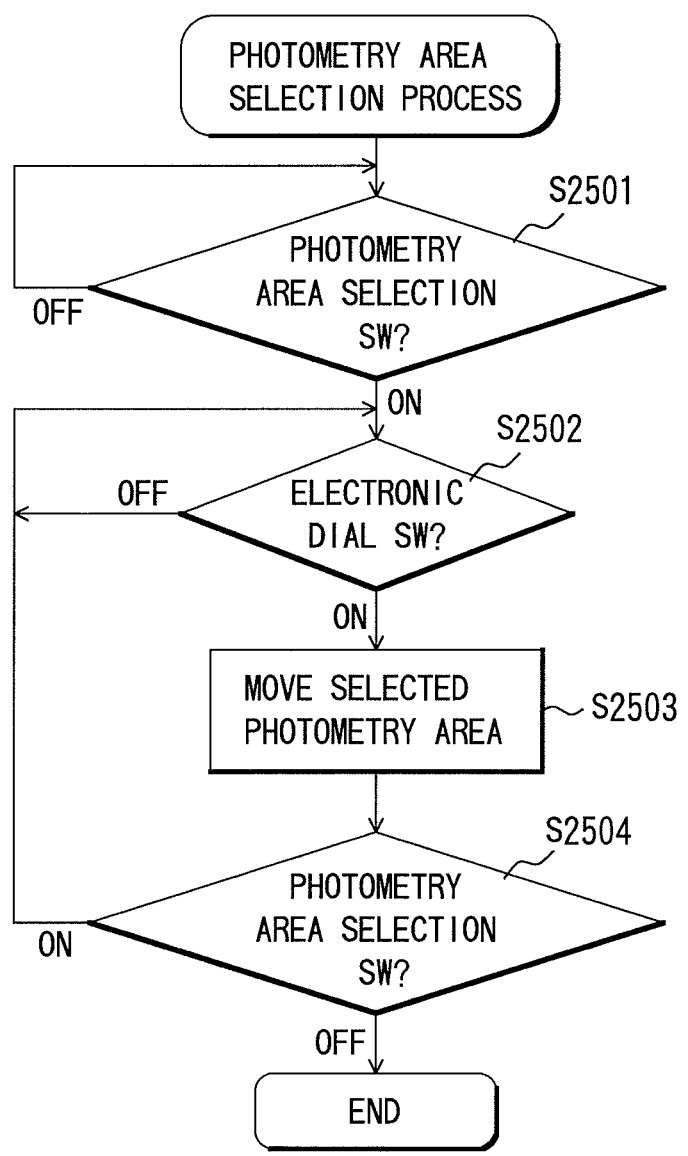
FIG. 22 is a flowchart showing the procedure of a photometry area selection process executed with the system controller of the electronic camera.

FIG. 22 is a flowchart showing the procedure of a photometry area selection process executed with the system controller 1223 of the electronic camera 1200.

In step S2501, the procedure waits until the photometry area selection switch 1235 is turned ON. When it is turned ON, the procedure advances to step S2502.

In step S2502, the procedure waits until the electronic dial switch 1226 has been operated. When it has been operated, the procedure advances to step S2503.

In step S2503, in accordance with the operation of the electronic dial switch 1226, the photometry area is switched to the subsequent area in a switching order among the photometry areas 1 to 3 shown in FIG. 18. The switching order is: all, the photometry area 1, the photometry area 2, the photometry area 3, all, or the reverse of this order, depending on the rotating direction of the electronic dial switch 1226. Each time the electronic dial switch 1226 is rotated, the area to be selected is switched in the above-described order.

In step S2504, it is determined whether the photometry area selection switch 1235 is still ON, and the procedure returns to step S2502 if it is ON, and terminates the photometry area selection process if it is not ON.

Figure 23:
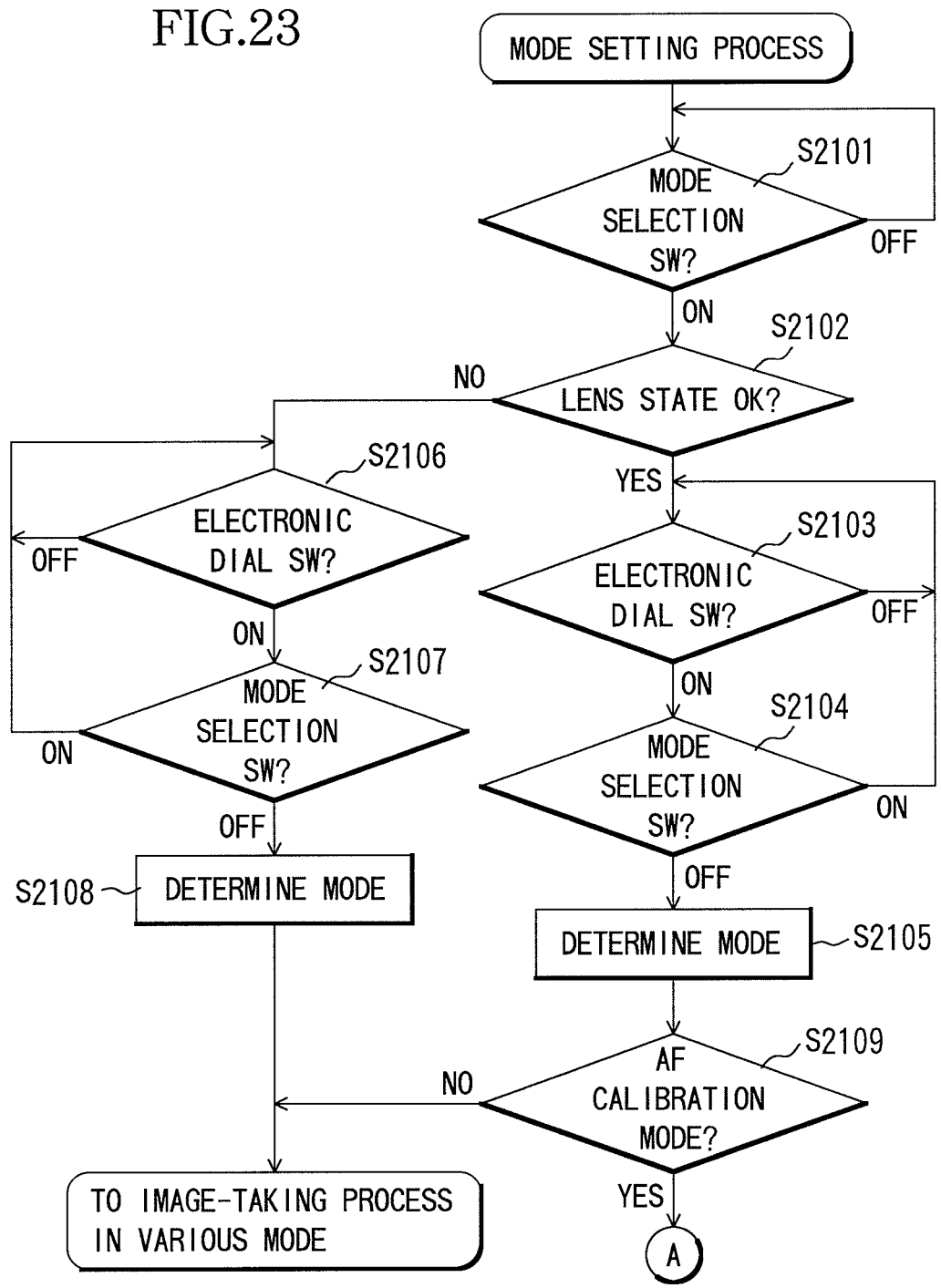
FIG. 23 is a flowchart showing the procedure of a setting process of an image-taking mode and an AF calibration mode executed with the system controller of the electronic camera.
Figure 24:
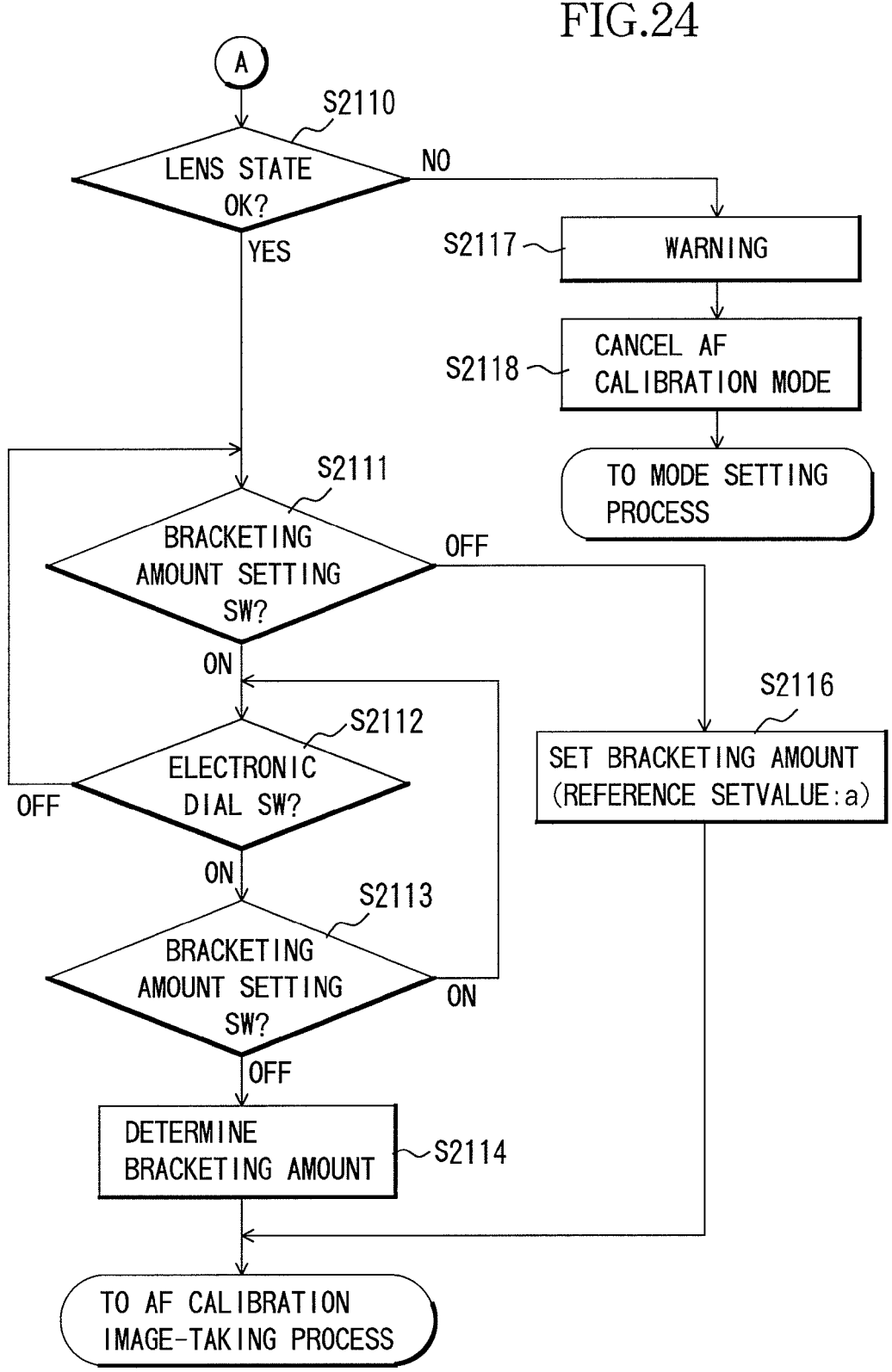
FIG. 24 is a flowchart showing the procedure of a setting process of an image-taking mode and an AF calibration mode executed with the system controller of the electronic camera.

FIGS. 23 and 24 are flowcharts showing the procedure of the process for setting an image-taking mode and an AF calibration mode executed with the system controller 1223 of the electronic camera 1200.

In step S2101, the procedure waits until the mode setting switch 1229 has been turned ON. When it has been turned ON, it is determined that a mode setting operation is started by the user, and the procedure advances to step S2102.

In step S2102, the system controller 1223 determines whether a lens apparatus is mounted on the electronic camera 1200 and whether a correction amount calculation process by the AF calibration mode can be performed on the mounted lens apparatus, based on the information unique to the lens obtained from the lens control circuit of the mounted lens apparatus, such as a focal length, open aperture value, a lens ID assigned to each individual lens, a lens type, manufacturer information and information on lens conditions.

If the system controller 1223 determines as a result of the determination that no lens apparatus is mounted on the electronic camera 1200, it determines that the selective setting of the AF calibration mode is not possible, and the procedure advances to step S2106 for setting a regular image-taking mode. On the other hand, if the system controller 1223 determines that the lens apparatus 1100 is mounted on the electronic camera 1200 and the correction amount calculation process by the AF calibration mode is possible, the procedure advances to step S2103 for setting a regular image-taking mode or an AF calibration mode. If the system controller 1223 determines that the lens apparatus 1100 is mounted on the electronic camera 1200, but the correction amount calculation process by the AF calibration mode is not possible, the procedure advances to step S2106.

Further, in step S2102, the system controller 1223 determines that the selective setting of the AF calibration mode is not possible, depending on the type of the lens apparatus mounted on the electronic camera 1200, that is, in the cases where the following lens apparatuses are mounted on the electronic camera 1200.

(1) Lens apparatus for manual focusing only: in the case of using this lens apparatus, it is not possible to drive the image-taking lens based on focus detection with the AF sensor 1204 and a focus detection circuit 1205, so that it is not possible to calculate a correction amount for correcting a focus position by autofocus detection.

(2) Lens apparatus capable of performing one or both of shift-driving and tilt-driving of the image-taking lens: in the case of using this lens apparatus, a portion of the image-taking optical system is shift-driven or tilt-driven, so that the image-taking optical axis is moved in parallel or tilted, with respect to the optical axis corresponding to the center of the image plane. Accordingly, the light flux entering the AF sensor 1204 differs from an ordinary light flux, so that it is not possible to accurately perform autofocus detection with the focus detection circuit 1205. Consequently, it is not possible to calculate an accurate correction amount for correcting a focus position by autofocus detection.

(3) Lens apparatus for macro image-taking only which is provided with an image-taking magnification of 1× or higher: in the case of using this lens apparatus, the movement amount of the focusing lens is large, so that the camera has the characteristics that the change in F value increases from infinity (the lowest magnification) toward the shorter distance (higher magnification) side and the F value is extremely large on the higher magnification side. Accordingly, it is impossible to perform autofocus detection with the AF sensor 1204 and the focus detection circuit 1205, so that it is not possible to calculate a correction amount for correcting a focus position by autofocus detection.

(4) Lens apparatus manufactured by a different manufacturer from that of the electronic camera 1200: in the case of using this lens apparatus, it is not possible to ensure that the information unique to the lens, such as a lens ID assigned to each individual lens, which is stored in the lens control circuit 1104 of the lens apparatus 1100 assumes a correct value specified by the manufacturer of the electronic camera 1200. Accordingly, it is not possible to calculate a correction amount for correcting a focus position by autofocus detection.

(5) Lens apparatus in which abnormality or failure occurs: in the case of using this lens apparatus, it is expected that accurate lens information cannot be obtained from the lens control circuit 1104 and that communication between the system controller 1223 and the lens control circuit 1104 cannot to be established, so that it is not possible to calculate a correction amount for correcting a focus position by autofocus detection.

It should be noted that the AF calibration mode is not selectable unless only one of the focus detection areas 1 to 3 is selected by the focus detection area selection process shown in FIG. 21.

In step S2106, the procedure waits until the electronic dial switch 1226 for mode selection has been operated. When the electronic dial switch 1226 has been operated, the image-taking mode is cyclically changed to "Tv", "Av", "P", "Tv" . . . , in accordance with the rotating operation. When the electronic dial switch 1226 is reversely rotated, the image-taking mode is cyclically changed to "Tv", "P", "Av", "Tv" . . . , in accordance with the rotating operation.

In step S2107, it is determined whether the mode setting switch 1229 turned ON in step S2101 has been turned OFF. The procedure advances to step S2108 if it has been turned OFF, or returns to step S2106 if it is still ON.

In step S2108, the currently selected image-taking mode is set in the electronic camera 1200, and the procedure advances to an image-taking process (not shown) corresponding to the set image-taking mode.

In step S2103, the procedure waits until the electronic dial switch 1226 for mode selection has been operated. When the electronic dial switch 1226 has been operated, the image-taking mode and the AF calibration mode are cyclically changed to "Tv", "Av", "P", "AF calibration", "Tv" . . . , in accordance with the rotating operation. When the electronic dial switch 1226 is reversely rotated, the image-taking mode and the AF calibration mode are cyclically changed to "Tv", "AF calibration", "P", "Av", "Tv" . . . , in accordance with the rotating operation.

In step S2104, it is determined whether the mode setting switch 1229 turned ON in step S2101 has been turned OFF. The procedure advances to step S2105 if it has been turned OFF, or returns to step S2103 if it is still ON.

In step S2105, the currently selected image-taking mode or AF calibration mode is set in the electronic camera 1200, and the procedure advances to step S2109.

In step S2109, it is determined whether the set mode is the AF calibration mode. The procedure advances to step S2110 if the set mode is the AF calibration mode, or advances to an image-taking process (not shown) corresponding to the image-taking mode if it is the image-taking mode.

In step S2110, it is determined again whether a lens apparatus is mounted on the electronic camera 1200 and whether a correction amount calculation process by the AF calibration mode can be performed on the mounted lens apparatus, based on the information unique to the lens which is obtained from the lens control circuit 1104 of the mounted lens apparatus. The reason why such determination is made again is that despite that the AF calibration mode is set, there is the possibility that the lens apparatus may have been replaced with one of the lens apparatuses (1) to (5) described in step S2102, that the lens apparatus may have been removed, or that an abnormality may have occurred in the mounted lens apparatus for some reason.

If it is determined in step S2109 that the AF calibration mode is set, and in step S2110 that a lens apparatus is mounted on the electronic camera 1200 and a correction amount calculation process by the AF calibration mode can be performed on the lens apparatus, the procedure advances to step S2111 to start preparing for image-taking in the AF calibration mode. On the other hand, if it is determined in step S2109 that the AF calibration mode is set, and in step S2110 that a lens apparatus is mounted on the electronic camera 1200, but a correction amount calculation process by the AF calibration mode cannot be performed on the lens apparatus, the procedure advances to step S2117.

In step S2117, a warning is provided to the user. Thereafter, the AF calibration mode is cancelled in step S2118, and the procedure returns to the image-taking mode setting process (step S2101 in FIG. 23).

Additionally, the warning to the user in step S2117 is given by providing, for example, a warning display on an external display of the electronic camera 1200 with a display circuit 1225, a warning display on a display in the viewfinder, an audio notification with a beeper 1234, or disabling the image-taking process by, for example, disabling the shutter release.

In step S2111, it is determined whether the bracketing amount setting switch 1232 has been turned ON, in order to set the AF bracketing amount during AF calibration image-taking. The procedure advances to step S2112 if it has been turned ON, or advances to step S2116 if it has not been turned ON.

Figure 25:
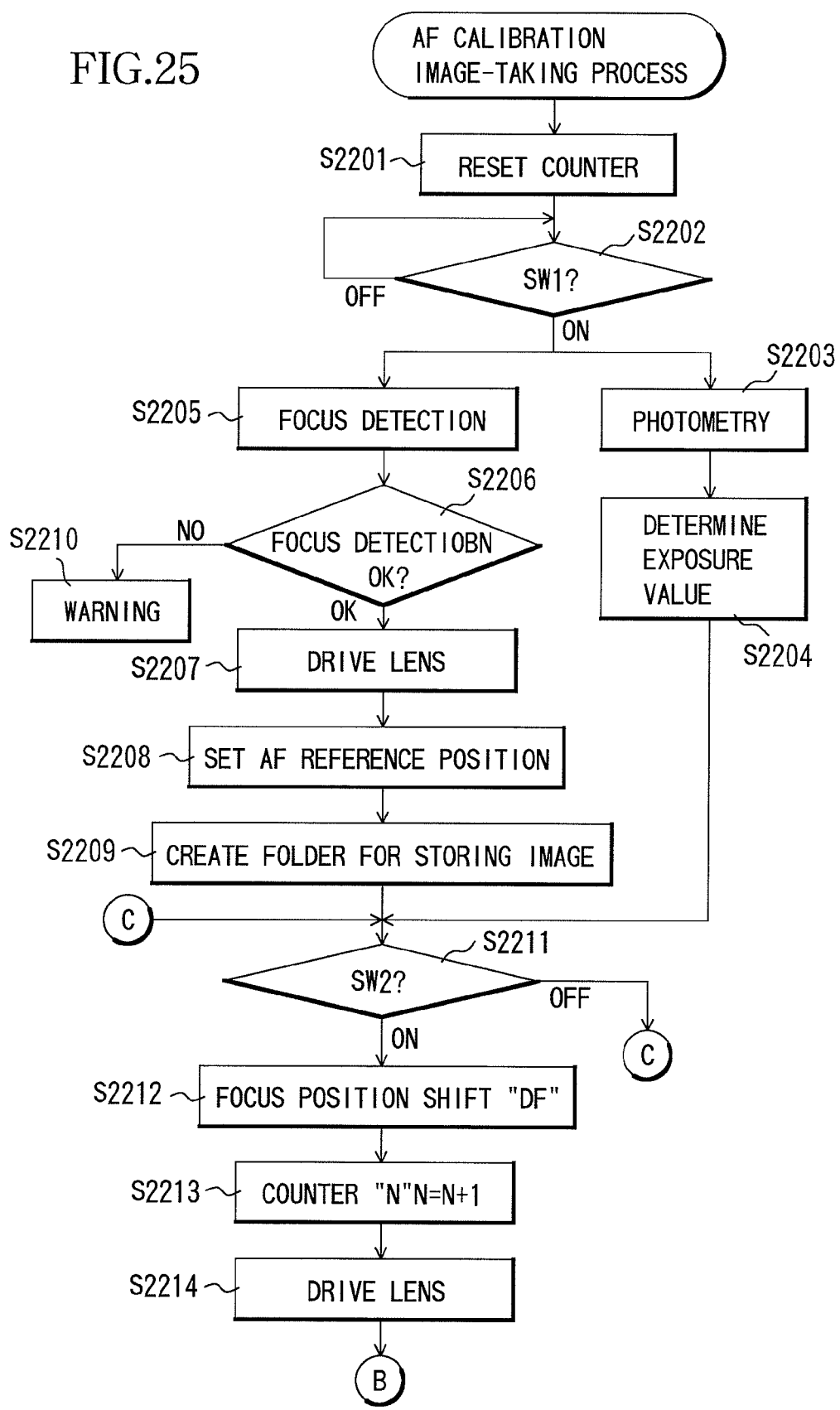
FIG. 25 is a flowchart showing the procedure of AF calibration image-taking process executed with the system controller of the electronic camera.

In step S2116, the AF bracketing amount during an AF calibration image-taking is set to the reference set value "a", and the procedure advances to the AF calibration image-taking process shown in FIG. 25.

In step S2112, it is determined whether the electronic dial switch 1226 has been operated. The procedure advances to step S2113 if the electronic dial switch 1226 has been operated, or returns to step S2111 if it has not been operated. If the electronic dial switch 1226 has been operated, the AF bracketing step amount is changed to "reference value a×0.25", "reference value a×0.5", "reference value a", "reference value a×2", "reference value a×4", or in the reversed direction, in accordance with the rotating operation. However, "reference value×0.25" and "reference value×4" are defined as the lower limit and the upper limit, respectively, and the AF bracketing step amount will not be changed to a value exceeding these limits even when the electronic dial switch 1226 is operated.

The reference value "a" of the AF bracketing step amount has been calculated by the system controller 1223 based on the following Equation (2), using open aperture value information (FNO) received from the aperture control circuit 1106.

$$\text{Reference value } a = d = FNO \times e \quad (2)$$

where e represents the permissible diameter of circle of confusion.

The reference value of this embodiment is defined as the same as the value of: depth of focus $d=FNO \times e$. In this embodiment, it is defined that $e=0.03$ mm.

As described above, the user can freely set the AF bracketing step amount by turning the bracketing amount setting switch 1232 ON, so that it is possible to narrow down the focus correction amount to an appropriate value by performing the AF calibration for a plurality of times while gradually changing the step amount (from a larger step amount to a smaller step amount), even when a significant focus correction is required.

In step S2113, it is determined whether the bracketing amount setting switch 1232 turned ON in step S2111 has been turned OFF. The procedure advances to step S2114 if it has been turned OFF, or returns to step S2112 if it is still ON.

In step S2114, the currently selected AF bracketing step amount is taken as a bracketing step amount "A" to be set.

Thereafter, the procedure advances to the AF calibration image-taking process shown in FIG. 25.

Figure 26:
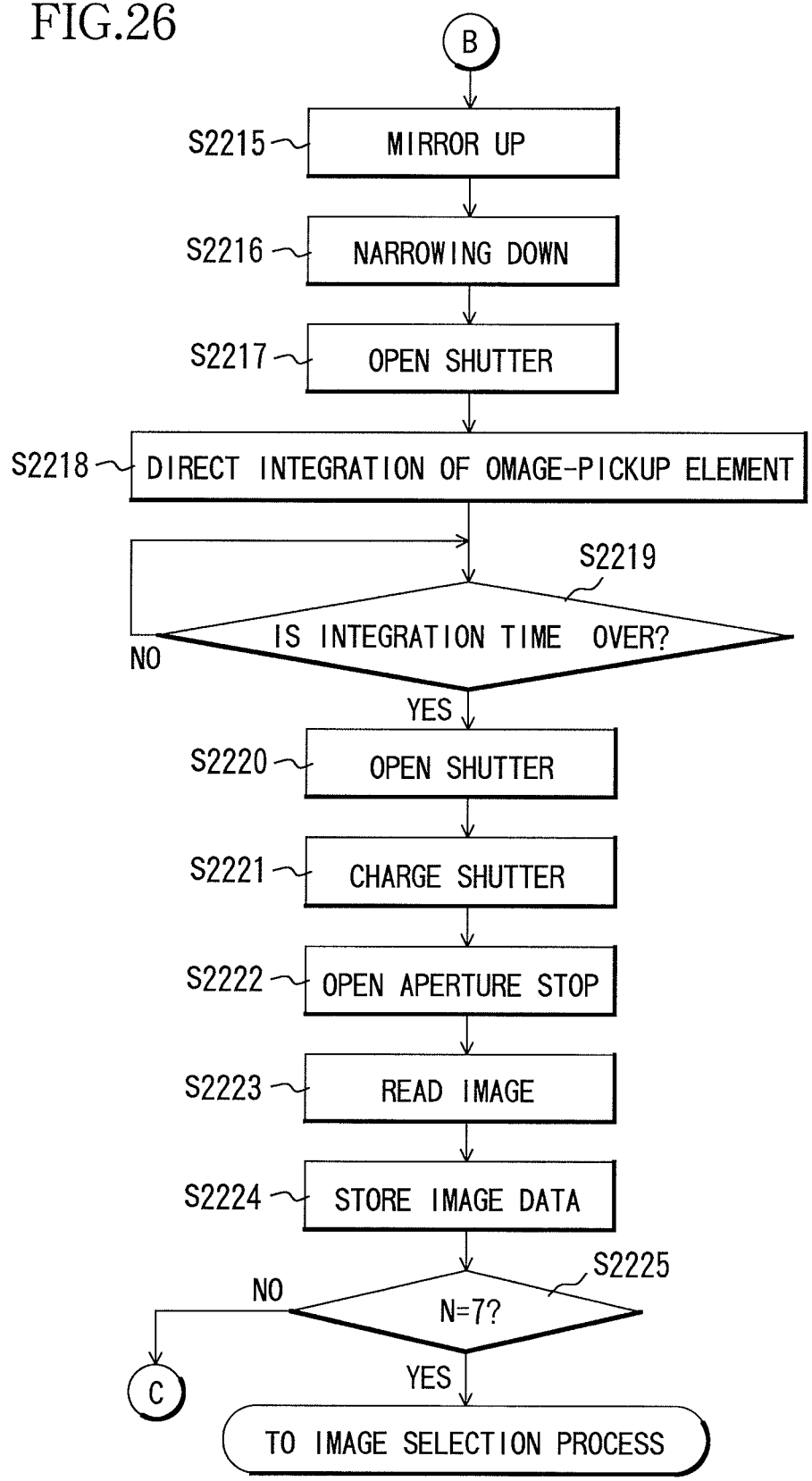
FIG. 26 is a flowchart showing the procedure of AF calibration image-taking process executed with the system controller of the electronic camera.

FIGS. 25 and 26 are flowcharts showing the procedures of the AF calibration image-taking process executed with the system controller 1223 of the electronic camera 1200.

In step S2201, the counter 1233 is reset.

In step S2202, the procedure waits until the release SW1 (1231) has been turned ON, and advances to steps S2203 and S2205 when it has been turned ON.

In step S2203, using the photometry circuit 1207, photometry is performed on a light flux which has passed through the image-taking lens 1101, been reflected by the quick-return mirror 1202 and passed through the pentaprism 1201. In step 2204, the system controller 1223 determines the exposure amount during image-taking, in accordance with the output from the photometry circuit 1207.

In step S2205, the system controller 1223 performs focus detection, using the AF sensor 1204 and the focus detection circuit 1205.

In step S2206, it is determined whether it was possible to detect the focus state. When the object on which the focus detection is performed is low-contrast or dark, it may not be possible to detect the focus state. If it was not possible to detect the focus state, the procedure advances to step 2210, in which a warning is provided. If it was possible to detect the focus state, the procedure advances to step S2207.

In step S2207, based on the focus detection result obtained in step 2205, the system controller 1223 transmits a lens driving amount to the lens control circuit 1104, and the lens control circuit 1104 controls the lens driving mechanism 1103 based on the transmitted lens driving amount. Then, the lens driving mechanism 1103 drives the image-taking lens 1101 to a focus position. At this time, if there is an AF correction amount (CAL data) already present (this will be described in detail later in step S2407 of FIG. 29), the lens driving amount can be obtained by the following Equation (3):

Lens driving amount=focus detection result+AF correction amount(adjustment data)during manufacturing+AF correction amount(CAL data)   (3)

In step S2208, the focus position of the image-taking 1101 which has been obtained by the lens driving in step S2207 is set as the AF reference position, which is stored by the system controller 1223. Then, in step S2209, the system controller 1223 directs the image data controller 1220 to create a folder for storing AF calibration image data in the image data recording medium 1218, and the image data controller 1220 creates the folder for storing AF calibration image data in the image data recording medium 1218 via the image compression circuit 1219.

In step S2211, the procedure waits until the release SW2 (1230) has been turned ON, and advances to step S2212 when it has been turned ON.

In step S2212, the system controller 1223 receives the current count number "N" from the counter 1233 and calculates a focus position shift amount "DF" based on the following Equation (4):

$$DF = A \times (N-4) \quad (4)$$

As described above, "A" represents the bracketing step amount set in step S2114.

In step S2213, the count number "N" of the counter 1233 is counted up by 1.

In step S2214, the system controller 1223 transmits the focus position shift amount "DF" calculated in step S2212 to the lens control circuit 1104, and the lens control circuit 1104 controls the lens driving mechanism 1103 to drive the image-taking lens 1101 to a position shifted by the focus position shift amount "DF".

In step S2215, the system controller 1223 controls the shutter charge-mirror driving mechanism 1211 to move the quick-return mirror 1202 up.

In step S2216, the system controller 1223 transmits aperture value information to the aperture control circuit 1106 based on the exposure amount determined in step S2204, and drives the aperture driving mechanism 1105 to narrow down the aperture value to the set value.

In step S2217, the system controller 1223 controls various sections to open the focal plane shutter 1208. Further, in step S2218, the system controller 1223 directs the image data controller 1220 to perform an integration operation of the image sensor 1210. In step S1219, the procedure waits for a predetermined integration time. Then, after an elapse of the predetermined integration time, the procedure advances to step S2220, in which the focal plane shutter 1208 is closed.

In step S2221, the system controller 1223 carries out the charging operation of the focal plane shutter 1208 and the driving of moving the mirrors down, in preparation for the next image-taking operation. In step S2222, the aperture stop 1102 is driven to the open position. In step S2223, the system controller 1223 directs the image data controller 1220 to capture image data from the image sensor 1210. At that time, the image data obtained from the image sensor 1210 may be image data within a limited area including the focus detection area used for focus detection.

In step S2224, the system controller 1223 transmits the current focus position shift amount "DF" to the image data controller 1220. Upon receiving this, the image data controller 1220 records the lens ID information, the image data and the focus position shift amount "DF" in association with one another in the image data recording medium 1218, via the image compression circuit 1219.

In step S2225, it is determined whether the count number "N" of the counter 1233 has reached a predetermined value (e.g., 7). If the count number "N" has reached a predetermined number, the AF calibration image-taking process is terminated and the procedure advances to the image selection process shown in FIG. 27. If the count number "N" has not reached a predetermined number, the procedure returns to step S2211.

Figure 27:
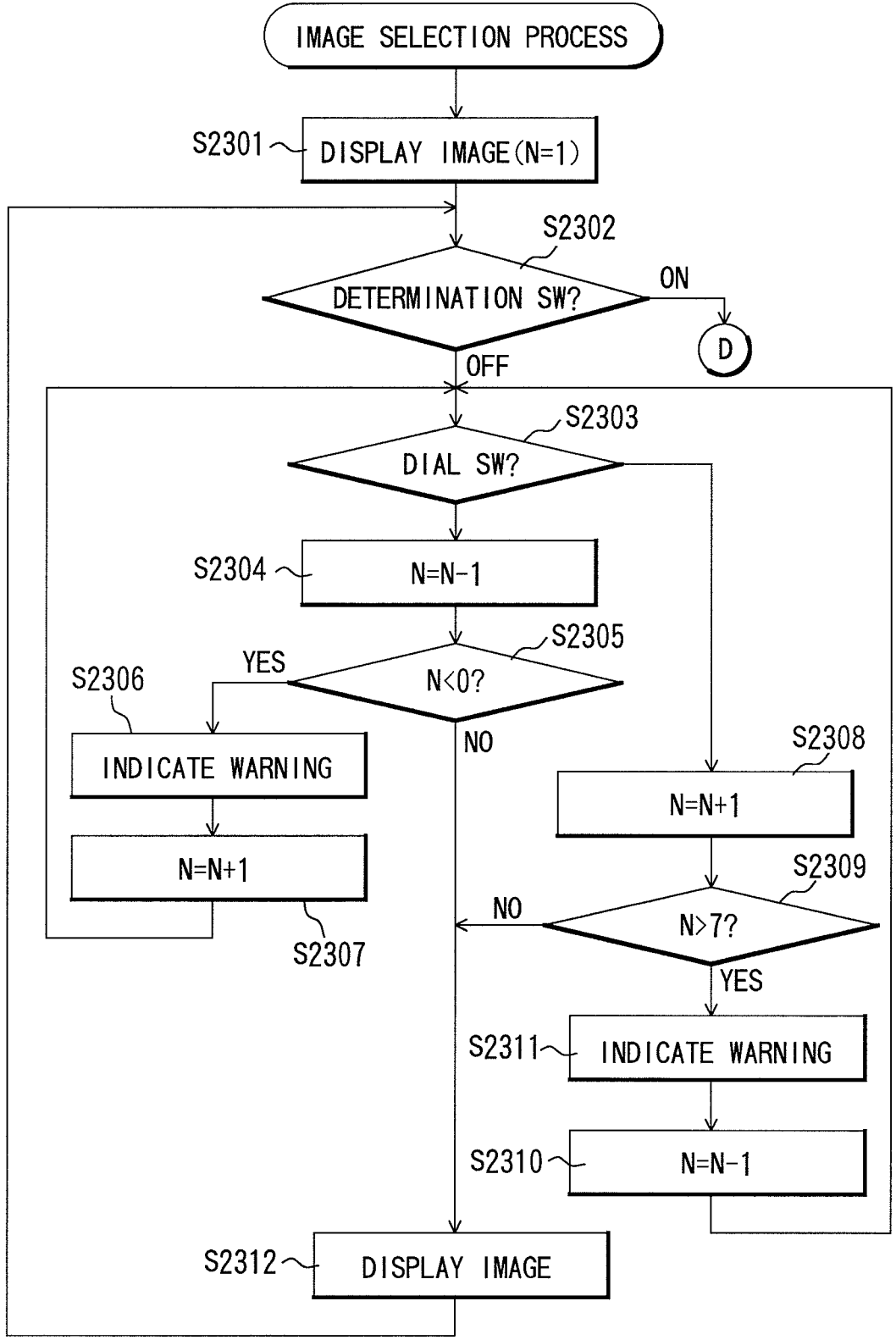
FIG. 27 is a flowchart showing the procedure of an image selection process in an AF calibration which is executed with the system controller of the electronic camera.
Figure 28:
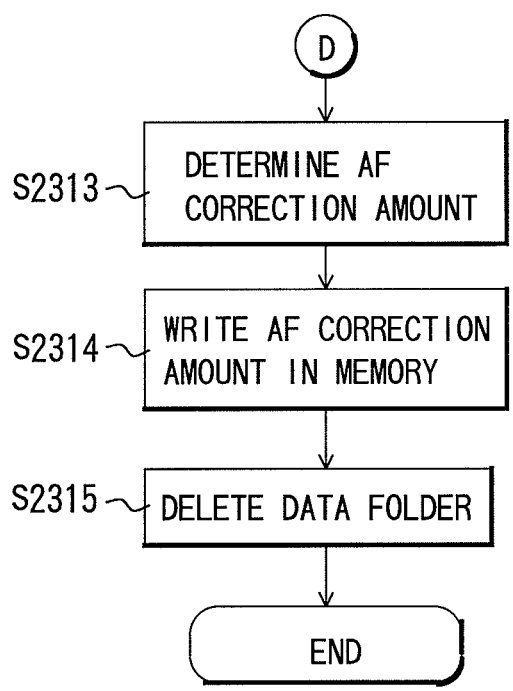
FIG. 28 is a flowchart showing the procedure of an image selection process in an AF calibration executed with the system controller of the electronic camera.

FIGS. 27 and 28 show flowcharts showing the procedure of the image selection process in the AF calibration which is executed with the system controller 1223 of the electronic camera 1200.

In step S2301, the system controller 1223 controls the image data controller 1220 such that the image data whose count number "N" is "1", which was obtained in the AF calibration image-taking process shown in FIGS. 25 and 26, is displayed with the image display circuit 1213. When displaying image data, the image display circuit 1213 performs an image processing different from that performed when displaying an image obtained by a regular image-taking process. More specifically, when displaying an image obtained by a regular image-taking process, edge enhancement process is carried out in order to improve the appearance of the image. However, when edge enhancement process is performed on image data obtained in the AF calibration mode, a portion of the image which is actually out of focus appears as if it is in focus. For this reason, there is the possibility that an image which is out of focus may be selected erroneously at the time of selecting an image which is in optimum focus from a group of images obtained in the AF calibration mode, so that an image processing different from that performed when displaying an image obtained by a regular image-taking process is performed.

In step S2302, it is determined whether the determination switch 1227 has been turned ON by a user who has seen the image displayed in step S2301 and determined that the image is in optimum focus. If it has been turned ON, the procedure advances to step S2313. If it has not been turned ON, the procedure advances to step S2303.

In step S2303, the operated state of the electronic dial switch 1226 is detected. The procedure advances to step S2304 if the electronic dial switch 1226 has been rotated leftward, or advances to step S2308 if it has been rotated rightward.

In step S2304, the count number "N" of the counter 1233 is counted down by only "1". In step S2305, it is determined whether the count number "N" is less than "0". The procedure advances to step S2306 if it is less than "0", or advances to step S2312 if it is equal to or greater than "0".

In step S2306, a warning that there is no AF calibration image data which can be selectively displayed is provided, using at least one of the image display circuit 1213 and the beeper 1234. In the subsequent step S2307, the count number "N" of the counter 1233 is counted up by only "1", and the procedure returns to step S2303.

In step S2308, the count number "N" of the counter 1233 is counted up by only "1". In step S2309, it is determined whether the count number "N" is greater than "7". The procedure advances to step S2311 if it is greater than "7", or advances to step S2312 if it is equal to or less than "7".

In step S2311, a warning that there is no AF calibration image data which can be selectively displayed is provided, using at least one of the image display circuit 1213 and the beeper 1234. In the subsequent step S2310, the count number "N" of the counter 1233 is counted down by only "1", and the procedure returns to step S2303.

In step S2312, the AF calibration image data corresponding to the current count number "N" of the counter 1233 is called up from the image data recording medium 1218 and displayed with the image display circuit 1213, and the procedure returns to step S2302.

In step S2313, the focus position shift amount "DF" recorded in the image data recording medium 1218 in association with the AF calibration image data displayed when the determination switch 1227 has been turned ON in step S2302 is determined as the AF correction amount (CAL data) for the focus detection area on which focus detection was performed. In the subsequent step S2314, the focus position shift amount "DF" determined as the AF correction amount (CAL data) in step S2313 is written in the EEPROM 1222, together with the lens ID of the lens control circuit 1104.

In step S2315, the entire AF calibration image data and the folder for AF calibration image data which have been stored in the image data recording medium 1218 are deleted.

Figure 29:
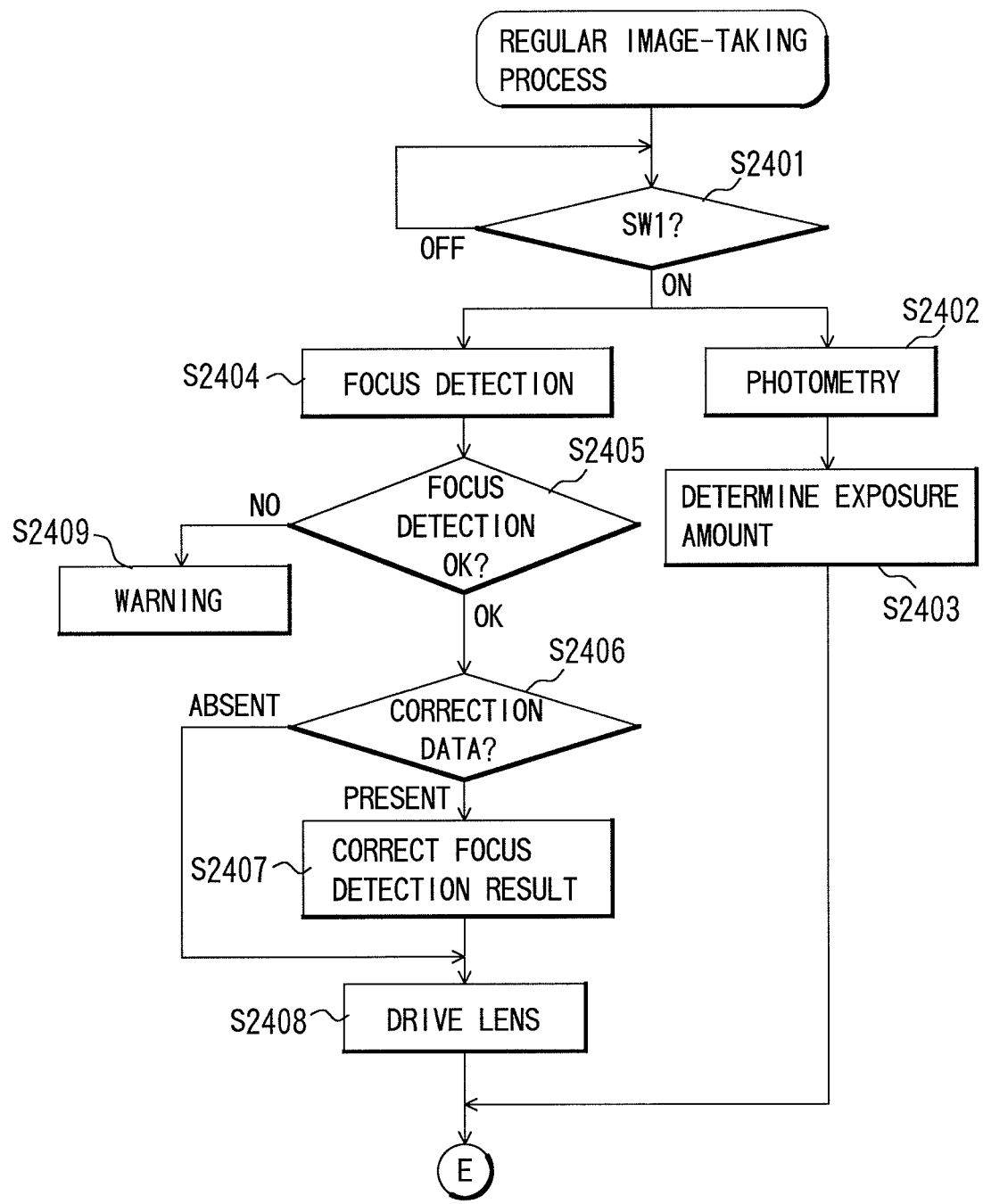
FIG. 29 is a flowchart showing the procedure of a regular image-taking process executed with the system controller of the electronic camera.
Figure 30:
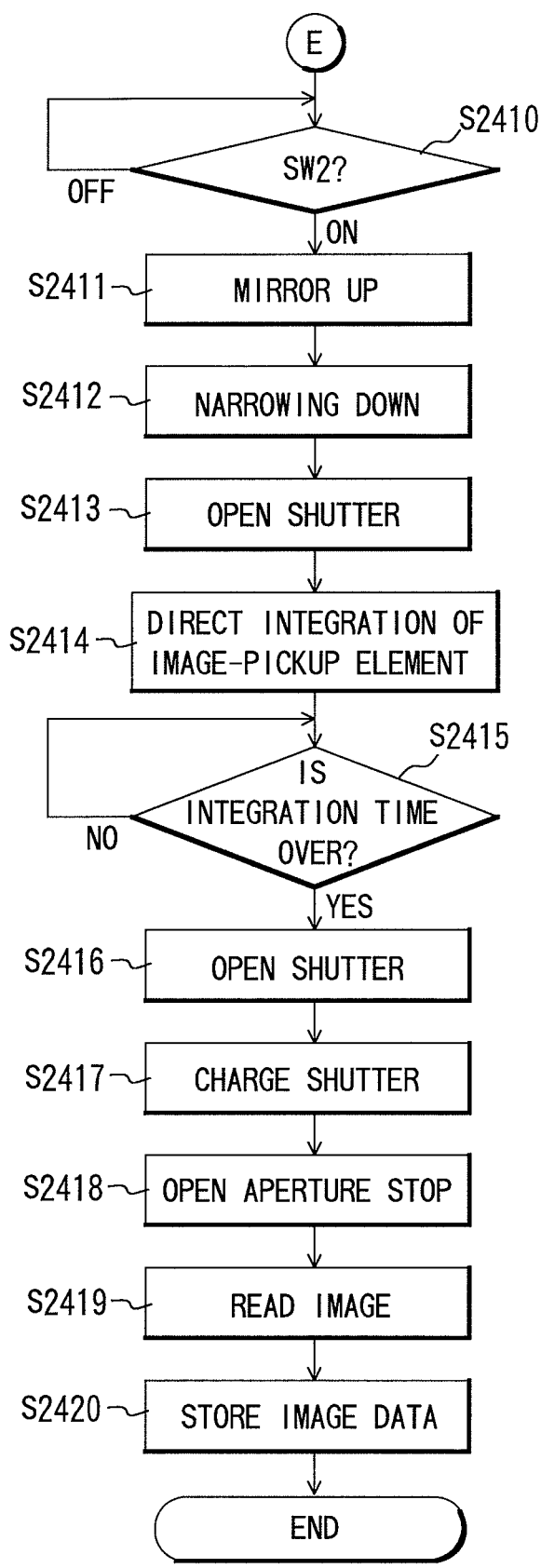
FIG. 30 is a flowchart showing the procedure of a regular image-taking process executed with the system controller of the electronic camera.

FIGS. 29 and 30 are flowcharts showing the procedure of the regular image-taking process executed with the system controller 1223 of the electronic camera 1200.

In step S2401, the procedure waits until the release SW1 (1231) has been turned ON, and advances to steps S2402 and S2404 when it has been turned ON.

In step S2402, using the photometry circuit 1207, photometry is performed on a light flux which has passed through the image-taking lens 1101, been reflected by the quick-return mirror 1202 and passed through the pentaprism 1201. In step 2403, the system controller 1223 determines the exposure amount during image-taking in accordance with the output from the photometry circuit 1207.

In step S2404, the system controller 1223 performs focus detection, using the AF sensor 1204 and the focus detection circuit 1205.

In step S2405, it is determined whether it was possible to detect the focus state. When the object on which the focus detection is performed is low-contrast or dark, it may not be possible to detect the focus state. If it was not possible to detect the focus state, the procedure advances to step 2409, in which a warning is provided. If it was possible to detect the focus state, the procedure advances to step S2406.

In step S2406, the system controller 1223 receives lens ID information from the lens control circuit 1104, and references the EEPROM 1222 to determine whether the AF correction amount (CAL data) of the focus detection area used in focus detection which corresponds to the lens ID information is stored. If it is stored, the procedure advances to step S2407, in which the system controller 1223 adds (makes a calculation based on the above-described Equation (3)) the AF correction amount (CAL data) to the focus detection result obtained in step S2404, and the procedure advances to step S2408. If the AF correction amount (CAL data) is not stored in the EEPROM 1222, the system controller 1223 does not add the AF correction amount to the focus detection result (step S2407 is skipped), and the procedure advances to step S2408.

In step S2408, based on the focus detection result (to which the AF correction amount may have been added), the system controller 1223 transmits a lens driving amount to the lens control circuit 1104, and the lens control circuit 1104 controls the lens driving mechanism 1103 based on the transmitted lens driving amount. Then, the lens driving mechanism 1103 drives the image-taking lens 1101 to a focus position.

In step S2410, the procedure waits until the release SW2 (1230) has been turned ON, and advances to step S2411 when it has been turned ON.

The processes performed in steps S2411 to S2420 are the same as those performed in steps S2215 to S2224 shown in FIG. 26, so that their description have been omitted here.

In this embodiment, a folder for AF calibration is created in the image data recording medium 1218, and a plurality of AF calibration images are stored in the folder. The plurality of AF calibration images and the folder are deleted upon completion of the lens driving after the user has selected an image from the plurality of AF calibration images and the AF correction amount has been determined. However, if there is enough room in the memory capacity of the image data recording medium 1218, the plurality of AF calibration images and the folder may not have to be erased upon completion of the AF calibration. In that case, it is not necessary to create the folder in step S2209 of FIG. 25, and to delete the plurality of AF calibration images and the folder in step S2315 of FIG. 28.

In addition, although the AF correction amount (CAL data) is stored in the EEPROM 1222 of the electronic camera 1200 in this embodiment, the AF correction amount (CAL data) alternatively may be stored in a memory circuit provided in the lens control circuit 1104 of the lens apparatus 1100, together with the camera ID information and the focus detection area information.

Further, in this embodiment, the image display is performed with the image display circuit 1213 of the electronic camera 1200 at the time of executing the image selection process shown in FIGS. 27 and 28. Alternatively, however, the image display process and the image selection process may be performed with the external control apparatus 1300 by sending image data to the external control apparatus 1300 via the communications interface circuit 1224.

Furthermore, although each process is executed with the system controller 1223 of the electronic camera 1200 in this embodiment, similar effects can also be achieved when the external control apparatus 1300 executes each process by controlling the system controller 1223 via the communications interface circuit 1224.

Although the AF bracketing amount is determined based on the open F value of the lens apparatus 1100 in this embodiment, the AF bracketing amount alternatively may be varied according to the focal length of the image-taking lens 1101. In the case where the image-taking lens 1101 is a zoom lens, the AF correction amount (CAL data) may be determined at each focal length and stored in the EEPROM 1222.

As described above, in this embodiment, image-taking is performed for a plurality of times while changing the focus position, and the plurality of image data obtained are recorded in the image data recording medium 1218 in association with focus position shift amounts. After completion of image-taking, an image which is in optimum focus is selected from the recorded plurality of image data by the user, and the focus position shift amount recorded in association with the selected image data is stored as the AF correction amount (CAL data). This process is performed for each lens apparatus, and autofocusing is carried out by correcting a focus detection result with the AF correction amount (CAL data) corresponding to the mounted lens apparatus, in regular image-taking. Accordingly, it is possible to obtain an image which is in optimum focus for each lens apparatus. Furthermore, the user can easily correct the focus position.

Moreover, it is possible to obtain a more accurate focus position correction amount (AF correction amount) by varying the focus position shift amount.

It is also possible to allow the user to easily correct the manufacturing errors of cameras and lens apparatuses to achieve favorable conditions.

Furthermore, at the time of reading image data from an image sensor (image-pickup element), only image data of a selected focus detection area is read, so that the time required for image reading can be saved.

Since a folder which stores image data obtained during calculation of correction data is created for this purpose only, the problem that the image data is mistaken for image data obtained in regular image-taking will not occur.

Furthermore, since image data obtained during calculation of correction data is deleted after calculating the AF correction amount (CAL data), it is possible to utilize the image data recording medium effectively.

Since the AF correction amount (CAL data) is recorded in the EEPROM 1222 of the electronic camera 1200 in association with the lens ID and the focus detection area, it is possible to record the AF correction amount (CAL data) for each lens apparatus and for each focus detection area. This effect can also be achieved when the AF correction amount (CAL data) is recorded in the memory circuit of the lens apparatus 1100 in association with the lens ID and the focus detection area.

Embodiment 8

In the following, Embodiment 8 of the present invention is described.

The constitution of this embodiment is basically the same as that of Embodiment 7. Therefore, in this embodiment, the same reference numerals and description are applied to parts that are the same as those in the constitution of Embodiment 7, and only parts that are different are described.

In this embodiment, the contents of the setting processes of the image-taking mode and the AF calibration mode shown in FIGS. 23 and 24 partially differ from those of Embodiment 7.

In this embodiment, similarly to Embodiment 7, the system controller 1223 determines in step S2102 shown in FIG. 23 whether a lens apparatus is mounted on the electronic camera 1200 and whether a correction amount calculation process by the AF calibration mode can be performed on the mounted lens apparatus based on the lens information obtained from the lens control circuit of the mounted lens apparatus.

Further, the system controller 1223 determines in step S2102 of this embodiment that the selective setting of the AF calibration mode is not possible, depending on the setting state of the lens apparatus mounted on the electronic camera 1200, that is, in the cases where the following setting states of the lens apparatus are detected.

(1) In the case where it is detected that an AF correction amount has already been set, by the AF calibration mode (correction amount calculation mode), for a lens apparatus in which an AF correction amount can be set: in this case, setting a new AF calibration mode may result in the possibility that an improper correction amount may be calculated by erroneous operations and this improper correction amount may be mistaken for the already existing accurate correction amount. Accordingly, the already existing correction amount is lost, and it is not possible to obtain an accurate focus detection result in regular image-taking.

(2) In the case where it is detected that a manual focus mode is set for a lens apparatus that can be switched between a manual focus mode and an autofocus mode: in this case, it is impossible to drive the image-taking lens based on focus detection with the AF sensor 1204 and the focus detection circuit 1205, so that it is not possible to calculate a correction amount for correcting a focus position detected by autofocus detection.

(3) In the case where it is detected that one or both of shift-driving and tilt-driving are set for a lens apparatus capable of performing one or both of shift-driving and tilt-driving of the image-taking lens: in this case, since a portion of the image-taking optical system is shift-driven or tilt-driven, the image-taking optical axis is moved in parallel or tilted, with respect to the optical axis corresponding to the center of the image plane. Accordingly, a light flux entering the AF sensor 1204 differs from an ordinary light flux, so that it is not possible to accurately detect the focus state by autofocus detection with the focus detection circuit 1205. Consequently, it is not possible to calculate an accurate correction amount for correcting a focus position by autofocus detection.

(4) In the case where it is detected that a macro mode is set for a lens apparatus capable of setting a macro mode which provides an image-taking magnification of 1× or higher: in this case, the movement amount of the focusing lens is large, so that the camera has the characteristics that the change in F value increases from infinity (the lowest magnification) toward the shorter distance (higher magnification) side and the F value is extremely large on the higher magnification side. Accordingly, it is impossible to perform autofocus detection with the AF sensor 1204 and the focus detection circuit 1205, so that it is not possible to calculate a correction amount for correcting a focus position by autofocus detection.

(5) In the case where it is detected that a focusing lens in the mounted lens apparatus is driven outside a predetermined object distance range: since various optical aberrations generally occur owing to variations in focus position of the lens apparatus, it is preferable to set a predetermined focus position and to correct the focus position by autofocus detection. Further, when autofocus detection with the focus detection circuit 1205 is performed based on an object located in positions (infinity end, closest end) at which the focus position is extremely moved, a large error occurs in a focus detection result and an accurate detection result cannot be obtained, so that it is not possible to calculate an accurate correction amount for correcting a focus position by autofocus detection.

(6) In the case where it is not possible to obtain accurate lens setting information from the lens control circuit 1104, or to establish communication between the system controller 1223 and the lens control circuit 1104, due to a problem or abnormality occurred in the mounted lens apparatus: in this case, it is not possible to calculate a correction amount for correcting a focus position by autofocus detection.

In this embodiment, similarly to step S2102 in this embodiment, the system controller 1223 determines in step S2109 shown in FIG. 23 whether a lens apparatus is mounted on the electronic camera 1200 and whether a correction amount calculation process by the AF calibration mode can be performed on the mounted lens apparatus, based on lens information obtained from the lens control circuit of the mounted lens apparatus. At the same time, the system controller 1223 determines that the selective setting of the AF calibration mode is impossible, depending on the setting state of the lens apparatus mounted on the electronic camera 1200, that is, in the cases where the above-described setting states (1) to (6) of the lens apparatus are detected.

The other processes are the same as those of Embodiment 7.

In Embodiments 7 and 8, the execution of the above-described correction amount calculation mode is disabled in the cases where specific lens apparatuses are mounted or no lens apparatus is mounted. Here, examples of the specific lens apparatuses include a lens apparatus for manual focusing only, a lens apparatus capable of shift-driving and/or tilt-driving, a lens apparatus for macro only and a lens apparatus manufactured by a manufacturer different from that of the image-taking apparatus.

The execution of the correction amount calculation mode is also disabled in the care where the lens apparatus are set to specific states. Here, the specific state includes a setting state of the lens apparatus in which an autofocus adjustment operation can be performed based on a focus position corrected with a correction amount, a setting state in which a manual focus mode is set for a lens apparatus that can be switched between a manual focus mode and an autofocus mode, a state in which one or both of shift-driving and tilt-driving are set, a state in which a macro mode is set, and a state in which the image-taking lens is driven outside a predetermined object distance range.

Accordingly, it is possible to ensure an accurate correction operation at the time of correcting variations in performance among individual lens apparatuses in the camera, and the user can easily determine whether the camera can correct variations in performance among individual lens apparatuses.

It should be noted that an object of the present invention can also be achieved by supplying a recording medium in which a software program code which realizes the functions of Embodiment 7 and 8 into a system or an apparatus, and letting a computer (or CPU, MPU or the like) of the system or the apparatus to read and execute the program code stored in the recording medium.

In this case, the program code read from the recording medium realizes the novel functions of the present invention, and the recording medium storing the program code and the program constitute the present invention.

Examples of the recording medium for supplying the program code includes flexible disks, hard disks, optical disks, magneto-optical disks, CD-ROMs, CD-Rs, CD-RWs, DVD-ROMs, DVD-RAMS, DVD-RWs, DVD+RWs, magnetic tapes, nonvolatile memory cards and ROMs. Or, the above-described program may be supplied by downloading from another computer, data base or the like connected to the Internet, a commercial network, a local area network or the like.

In addition to the case where the computer executes the read program code and thereby realizes the functions of each of the above-described embodiments, the present invention also includes the case where an OS (operating system) or the like operating on the computer performs a portion or all the actual processes in accordance with the direction of the program code and the functions of each of the above-described embodiments are realized by that process.

Furthermore, the present invention includes the case where, after the program code read from the recording medium is written in a memory which is provided in a function expansion board inserted in the computer or a function expansion unit connected to the computer, a CPU or the like provided in the function expansion board or the function expansion unit performs a portion of all the actual processes in accordance with the direction of the program code and the functions of each of Embodiments 7 and 8 described above are realized by that process.

While preferred embodiments have been described, it is to be understood that modification and variation of the present invention may be made without departing from the scope of the following claims.

"This application claims priorities from Japanese Patent Application Nos. 2003-417349 filed Dec. 15, 2003, 2004-178451 filed Jun. 16, 2004 and 2004-037645 filed Feb. 16, 2004 which are hereby incorporated by reference herein."

What is claimed is:

1. A camera on which a lens apparatus can be mounted, comprising:
   a controller which performs a focusing control corresponding to the mounted lens apparatus;
   a display unit which performs a display process corresponding to an output of the controller; and
   a storage section which stores correction information for correcting a calculation result in the focusing control by the controller, in association with the mounted lens apparatus;
   wherein the controller identifies the mounted lens apparatus, determines whether the correction information corresponding to the identified lens apparatus is stored in the storage section, and outputs a signal corresponding to a result of the determination to the display unit, and the display unit, in response to the signal output by the controller, displays information related to the correction information corresponding to the mounted lens apparatus.

2. The camera according to claim 1, wherein the controller determines the correction information in a state in which the lens apparatus is mounted on the camera, and stores the determined correction information in the storage section in association with the lens apparatus.

3. The camera according to claim 1, further comprising a detector which detects a mounted state of the lens apparatus, wherein the controller performs the determination in a case where the detector detects that the lens apparatus is mounted.

4. The camera according to claim 1, further comprising an operation unit which instructs the controller to perform the determination in accordance with an operation by a user.

5. The camera according to claim 1, wherein the controller provides a warning with the display unit in a case where the correction information corresponding to the mounted lens apparatus is not stored in the storage section.

6. A camera system comprising:
a camera according to claim 1; and
a lens apparatus mounted on the camera.

7. A camera on which a lens apparatus can be mounted, comprising:
a controller which performs a focusing control corresponding to the mounted lens apparatus;
a display unit which performs a display process corresponding to an output of the controller; and
a storage section which stores correction information for correcting a calculation result in the focusing control by the controller, in association with the mounted lens apparatus,
wherein the display unit, in accordance with discrimination of the mounted lens apparatus, displays information, stored in the storage section, related to the correction information corresponding to the mounted lens apparatus.

8. The camera according to claim 7, wherein the controller determines the correction information in a state in which the lens apparatus is mounted on the camera, and stores the determined correction information in the storage section in association with the lens apparatus.

9. The camera according to claim 7, further comprising a detector which detects a mounted state of the lens apparatus, wherein the controller performs the discrimination of the mounted lens apparatus, in a case where the detector detects that the lens apparatus is mounted.

10. The camera according to claim 7, further comprising an operation unit which instructs the controller to perform the discrimination of the mounted lens apparatus, in accordance with an operation by a user.

11. The camera according to claim 7, wherein the controller provides a warning with the display unit in a case where the correction information corresponding to the mounted lens apparatus is not stored in the storage section.

12. A camera system comprising:
a camera according to claim 7; and
a lens apparatus mounted on the camera.

13. The camera according to claim 7, wherein the display unit, in accordance with discrimination of the mounted lens apparatus, displays the information stored in the storage section related to the correction information corresponding to the mounted lens apparatus, in a case where the correction information corresponding to the mounted lens apparatus is stored in the storage section.

14. The camera according to claim 7, wherein the correction information is acquired in a calibration operation.

15. The camera according to claim 7, wherein the display is in accordance with a selected focus point.

* * * * *